US012712858B2

(12) United States Patent
Lipskin

(10) Patent No.: US 12,712,858 B2
(45) **Date of Patent: *Aug. 18, 2026**

(54) COMPUTER-IMPLEMENTED METHOD AND SYSTEM FOR REAL-TIME HUMAN AUTHORIZATION OF DIGITAL DOCUMENT LIFECYCLE TRANSITIONS

(71) Applicant: The Mirror Project LLC, Boca Raton, FL (US)

(72) Inventor: Scott Lipskin, Boca Raton, FL (US)

(73) Assignee: The Mirror Project LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/576,524

(22) Filed: Mar. 24, 2026

(65) Prior Publication Data

US 2026/0222391 A1 Jul. 30, 2026

Related U.S. Application Data

(63) Continuation-in-part of application No. 19/461,799, filed on Jan. 28, 2026, and a continuation-in-part of application No. 19/534,902, filed on Feb. 10, 2026.

(Continued)

(51) Int. Cl.
*H04L 29/06* (2006.01)
*H04L 9/40* (2022.01)

(52) U.S. Cl.
CPC ................................ *H04L 63/0428* (2013.01)

(58) Field of Classification Search
CPC ....... H04W 12/50; H04L 63/0428; G06F 8/65
See application file for complete search history.

(56) References Cited

U.S. PATENT DOCUMENTS 10,796,086 B2 10/2020 Lewbel
10,931,461 B2 * 2/2021 Dilles ..................... G06F 21/33

(Continued)

FOREIGN PATENT DOCUMENTS

EP 3373177 B1 3/2020
IN 202511080376 A 9/2025

(Continued)

OTHER PUBLICATIONS

Ali Alizadeh, Fassment: Reframing Digital Identity from Delegated Credentials to Live Human Presence, Jan. 9, 2026.

(Continued)

*Primary Examiner* — Wasika Nipa

(74) *Attorney, Agent, or Firm* — The Powers IP Law Firm

(57) ABSTRACT

A computer-implemented authorization method is provided. The method includes generating with at least one cryptographic module a first real-time digital authorization artifact based on a first live human authorization event; consuming the first real-time digital authorization artifact at a document entity as an authority access signal in order to trigger a number of lifecycle state transitions of a digital document being represented by the document entity; generating with the at least one cryptographic module a second real-time digital authorization artifact based on a second live human authorization event; employing the second real-time digital authorization artifact with a temporal query interface in order to resolve requests to access the digital document; receiving a sequence from an autonomous agent at an authority enforcement module; and preventing the autonomous agent from accessing the digital document because the autonomous agent did not generate the first and second real-time digital authorization artifacts.

14 Claims, 14 Drawing Sheets

Related U.S. Application Data

(60) Provisional application No. 64/014,310, filed on Mar. 23, 2026.

(56) References Cited

U.S. PATENT DOCUMENTS

| | | | | |
|---|---|---|---|---|
| 11,276,039 | B2 | 3/2022 | Venkatraman et al. | |
| 11,418,497 | B2 | 8/2022 | Rathore et al. | |
| 11,449,911 | B2 | 9/2022 | Fang et al. | |
| 11,687,495 | B2 | 6/2023 | Wylie et al. | |
| 11,716,630 | B2 | 8/2023 | Lim et al. | |
| 12,076,649 | B2 | 9/2024 | Gillis et al. | |
| 12,166,858 | B2 | 12/2024 | Komandur et al. | |
| 12,586,072 | B1 | 3/2026 | Goldman | |
| 2018/0336326 | A1 | 11/2018 | Wallace | |
| 2019/0028892 | A1 | 1/2019 | Henry | |
| 2019/0236124 | A1 | 8/2019 | Bumby et al. | |
| 2019/0372970 | A1 | 12/2019 | Yan | |
| 2020/0065361 | A1* | 2/2020 | Lewbel | G06F 3/0485 |
| 2021/0006415 | A1 | 1/2021 | Sun | |
| 2021/0173916 | A1 | 6/2021 | Ortiz | |
| 2021/0279316 | A1 | 9/2021 | Eisen | |
| 2022/0019649 | A1 | 1/2022 | Boyd | |
| 2022/0078020 | A1 | 3/2022 | Banchelin | |
| 2022/0147602 | A1 | 5/2022 | Streit | |
| 2022/0277064 | A1 | 9/2022 | Streit | |
| 2023/0044085 | A1 | 2/2023 | Lim | |
| 2024/0071141 | A1 | 2/2024 | Fasoli | |
| 2024/0121290 | A1* | 4/2024 | Soman | G06F 21/6218 |
| 2024/0275790 | A1 | 8/2024 | Reddy et al. | |
| 2024/0370827 | A1 | 11/2024 | Zionpour et al. | |
| 2025/0173446 | A1 | 5/2025 | Hadi | |
| 2025/0190990 | A1 | 6/2025 | Veazey | |
| 2025/0291512 | A1 | 9/2025 | Gilchrist et al. | |
| 2025/0384117 | A1 | 12/2025 | Tussy | |
| 2026/0019265 | A1 | 1/2026 | Poh | |
| 2026/0039479 | A1 | 2/2026 | Prabhakar | |
| 2026/0112198 | A1 | 4/2026 | Chivers | |
| 2026/0134714 | A1 | 5/2026 | Turgeman | |

FOREIGN PATENT DOCUMENTS

| | | | |
|---|---|---|---|
| IN | 202521098632 | A | 10/2025 |
| IN | 202511110005 | A | 12/2025 |
| WO | 2021030527 | A1 | 2/2021 |
| WO | 2025253260 | A1 | 12/2025 |

OTHER PUBLICATIONS

Interlink, InterLink ID: Proof of Personhood, Jan. 21, 2026.

Mohan Raj, Generating Authentication Token for Agora Applications, Jan. 20, 2021.

* cited by examiner

COMPUTER-IMPLEMENTED METHOD AND SYSTEM FOR REAL-TIME HUMAN AUTHORIZATION OF DIGITAL DOCUMENT LIFECYCLE TRANSITIONS

CROSS-REFERENCE TO RELATED APPLICATIONS

This application is a continuation-in-part patent application, which claims priority to and claims the benefit of each of U.S. patent application Ser. No. 19/461,799, filed Jan. 28, 2026, U.S. patent application Ser. No. 19/534,902, filed Feb. 10, 2026, and U.S. Patent Application Ser. No. 64/014,310, filed Mar. 23, 2026, the contents of which are incorporated herein by reference in their entirety.

BACKGROUND

Passwords and traditional session-based authentication mechanisms are insufficient in modern software environments due to phishing, credential theft, replay attacks, session hijacking, SIM-swap vulnerabilities, and deficiencies in terms of proving human presence. Existing approaches that do not employ passwords (e.g., device unlock states, passkeys, and biometrics) may authenticate an account or device, but suffer from a number of drawbacks. These drawbacks become quite pronounced in emerging agentic artificial intelligence (AI) environments in which actions may be initiated, chained, or delegated by autonomous systems, such that it is often difficult to establish clear human authorization boundaries and attribution.

Additionally, existing document systems (e.g., word processors, collaborative docs, PDFs, repositories) suffer from several structural limitations. First, documents often drift over time. Second, "versions" are often implemented as copies, forks, or snapshots. Third, historical references are often fragile and can be altered, deleted, or obscured. Fourth, users typically must trust process guarantees when determining what is true within a document. These limitations and others become critical in legal, financial, technical, contractual, and decision-making contexts.

It is with respect to these and other considerations that the instant disclosure is concerned.

SUMMARY

In one aspect of the disclosed concept, a computer-implemented authorization method is provided. The method comprises generating with at least one cryptographic module a first real-time digital authorization artifact based on a first live human authorization event, and emitting the first real-time digital authorization artifact from the at least one cryptographic module; consuming the first real-time digital authorization artifact at a document entity as an authority access signal in order to trigger a number of lifecycle state transitions of a digital document being represented by the document entity; generating with the at least one cryptographic module a second real-time digital authorization artifact based on a second live human authorization event, and emitting the second real-time digital authorization artifact from the at least one cryptographic module; employing the second real-time digital authorization artifact with a temporal query interface in order to resolve requests to access the digital document; receiving a sequence from an autonomous agent at an authority enforcement module; and preventing the autonomous agent from accessing the digital document because the autonomous agent did not generate the first and second real-time digital authorization artifacts.

In another aspect of the disclosed concept, an authorization system is provided. The system comprises at least one cryptographic module configured to generate a first real-time digital authorization artifact based on a first live human authorization event, emit the first real-time digital authorization artifact, generate a second real-time digital authorization artifact based on a second live human authorization event, and emit the second real-time digital authorization artifact; a document entity configured to consume the first real-time digital authorization artifact as an authority access signal in order to trigger a number of lifecycle state transitions of a digital document being represented by the document entity; a temporal query interface configured to employ the second real-time digital authorization artifact in order to resolve requests to access the digital document; and an authority enforcement module configured to receive a sequence from an autonomous agent, and prevent the autonomous agent from accessing the digital document because the autonomous agent did not generate the first and second real-time digital authorization artifacts.

DETAILED DESCRIPTION

In the following description, for the purposes of explanation, numerous specific details are set forth in order to provide a thorough understanding of various embodiments of the invention. As used herein, "embodiments" are non-limiting examples of apparatuses or methods employing one or more of the inventive concepts disclosed herein. It is apparent, however, that various embodiments may be practiced without these specific details or with one or more equivalent arrangements. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features of the various embodiments may be otherwise combined, separated, interchanged, and/or rearranged without departing from the inventive concepts.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "may include," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, may be used as terms of approximation and not as terms of degree, and, as such, are utilized to account for inherent deviations in measured, calculated, and/or provided values that would be recognized by one of ordinary skill in the art.

As employed herein, the term "number" shall mean one or an integer greater than one (i.e., a plurality).

As employed herein, the phrase "malleable representation of a digital document" shall mean a representation of a digital document that is in a malleable state corresponding to the digital document being modifiable (e.g., without limitation, editable).

As employed herein, the phrase "fixed representation of a digital document" shall mean a representation of a digital document that is in a fixed state corresponding to the digital document being preserved at a specific moment in time.

As employed herein, the phrase "absolute representation of a digital document" shall mean a representation of a digital document that is in an absolute state corresponding to the digital document being permanently finalized.

Figure 1:
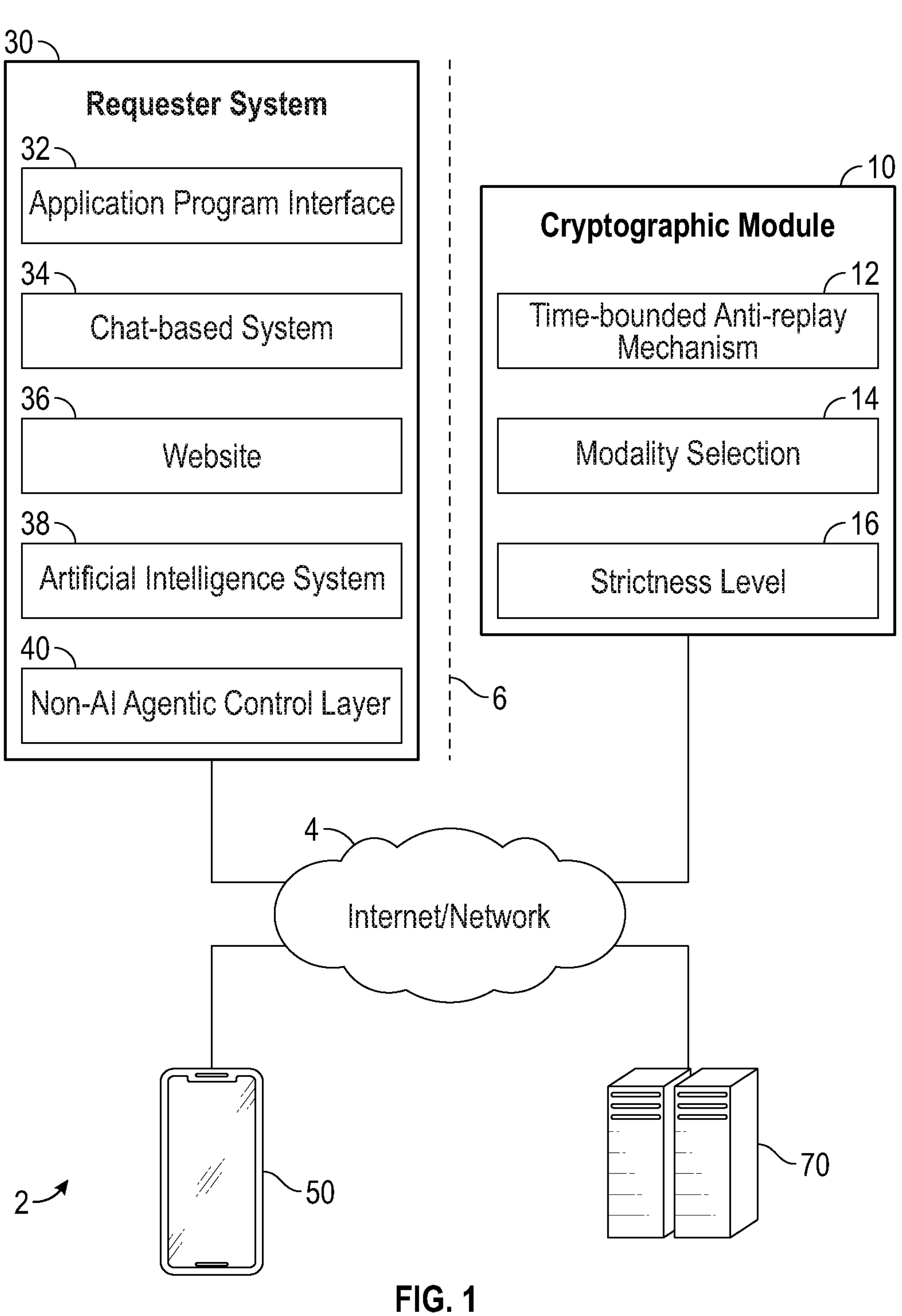
FIG. 1 is a schematic of an authorization system, shown as employed with a user device and a backend server, in accordance with one non-limiting embodiment of the disclosed concept.

FIG. 1 shows an authorization system 2 as employed with a user device 50 and a backend server 70, in accordance with one non-limiting embodiment of the disclosed concept. In one example, the authorization system 2 may include a cryptographic module 10 (e.g., without limitation, a hardware-backed key store such as a secure enclave, TPM, and TEE) and a requester system 30, each of which may be communicable over an internet/network 4, and each of which may be architecturally separated from one another. In one example, the disclosed authorization system 2 may treat human authorization itself as a distinct, enforceable system layer that produces an artifact for downstream consumption.

More specifically, the cryptographic module 10 may be configured to generate a real-time digital authorization artifact 120 (e.g., without limitation, a cryptographically verifiable authorization artifact) based on a live human authorization event, and emit the real-time digital authorization artifact 120. Furthermore, the requester system 30 may be configured to consume the real-time digital authorization artifact 120 as a prerequisite for an action 46 in order to prove that a real human being 100 was present and authorized during a set time window on the user device 50. The real-time digital authorization artifact 120 may be bound to the user device 50 and be consumable (e.g., without limitation, machine-consumable) by downstream software systems.

In one example, the real-time digital authorization artifact 120 may prove that the real human being 100 was present and authorized at a given time on a specific enrolled device, which may be the user device 50. The authorization system 2 may use live human presence verification with a number of biometric participations, device-owner confirmation, and time-bounded anti-replay mechanisms. Furthermore, the generated real-time digital authorization artifact 120 may be consumed by the external requester system 30 as a prerequisite for the action 46, and such that the authorization system 2 may not make decisions, interpret intent, or execute actions, but have as one example purpose the establishment of real-time human authorization and emission of a verifiable authorization event.

For example, the authorization system 2 may be configured to verify both that the real human being 100 is physically present and interacting in real time, and that the correct authorized human associated with the bound device (e.g., the user device 50) and authorization context is the one providing consent. The authorization system 2 may explicitly distinguish between mere human presence and correct human authorization. Authorization signals may not be satisfied by the presence of an arbitrary, substitute, or coerced individual, even if that individual is human.

The authorization system 2 may thus answer the question of whether a real human being, and the correct intended human being, was physically present with the bound device and explicitly authorizing an action at a specific moment in time. The determination of the correct authorized human may not rely on persistent identity sessions, password-based authentication, or long-term biometric storage. Instead, correct-human authorization may be enforced through a combination of a prior device-to-human association, an explicit user consent to participate in authorization signaling, a live, real-time authorization interaction, a device-bound authorization capture, and a rejection of authorization attempts originating from non-bound or remote devices.

Accordingly, the authorization system 2 may generate authorization only when the bound user device 50 confirms that the participating real human being 100 corresponds to the intended authorization context at the moment of request. Existing authentication or liveness-detection systems (not shown), by way of contrast, may verify that a human is present or that credentials are valid, but may not enforce that the intended human associated with a specific authorization context is the one providing consent at the moment of action. The disclosed authorization system 2 may thus introduce a real-time authorization boundary that verifies correct human presence, not generic human interaction or account access. Furthermore, the verification in the authorization system 2 may be performed solely for real-time authorization and may not constitute identity authentication, identity storage, or permission evaluation. That is, the authorization system 2 may produce a time-limited authorization event rather than a persistent identity assertion.

As will be discussed, the real-time digital authorization artifact 120 may be, for example and without limitation, a discrete, time-bound, non-replayable artifact proving that a live human was present and explicitly authorized at a specific moment on a specific device, such as the user device 50. Usage of the real-time digital authorization artifact 120 may advantageously allow for authentication and authorization, access control, identity assurance, and control-plane enforcement in software-mediated environments including messaging and chat, web services, mobile applications, and AI/agentic systems. More specifically, the disclosed authorization system 2 may not employ passwords, authorization inferred from login information, or session-based authentication mechanisms in order to avoid phishing, credential theft, replay attacks, session hijacking, and SIM-swap vulnerabilities, and may do so while proving real-time human presence.

Figure 2A:
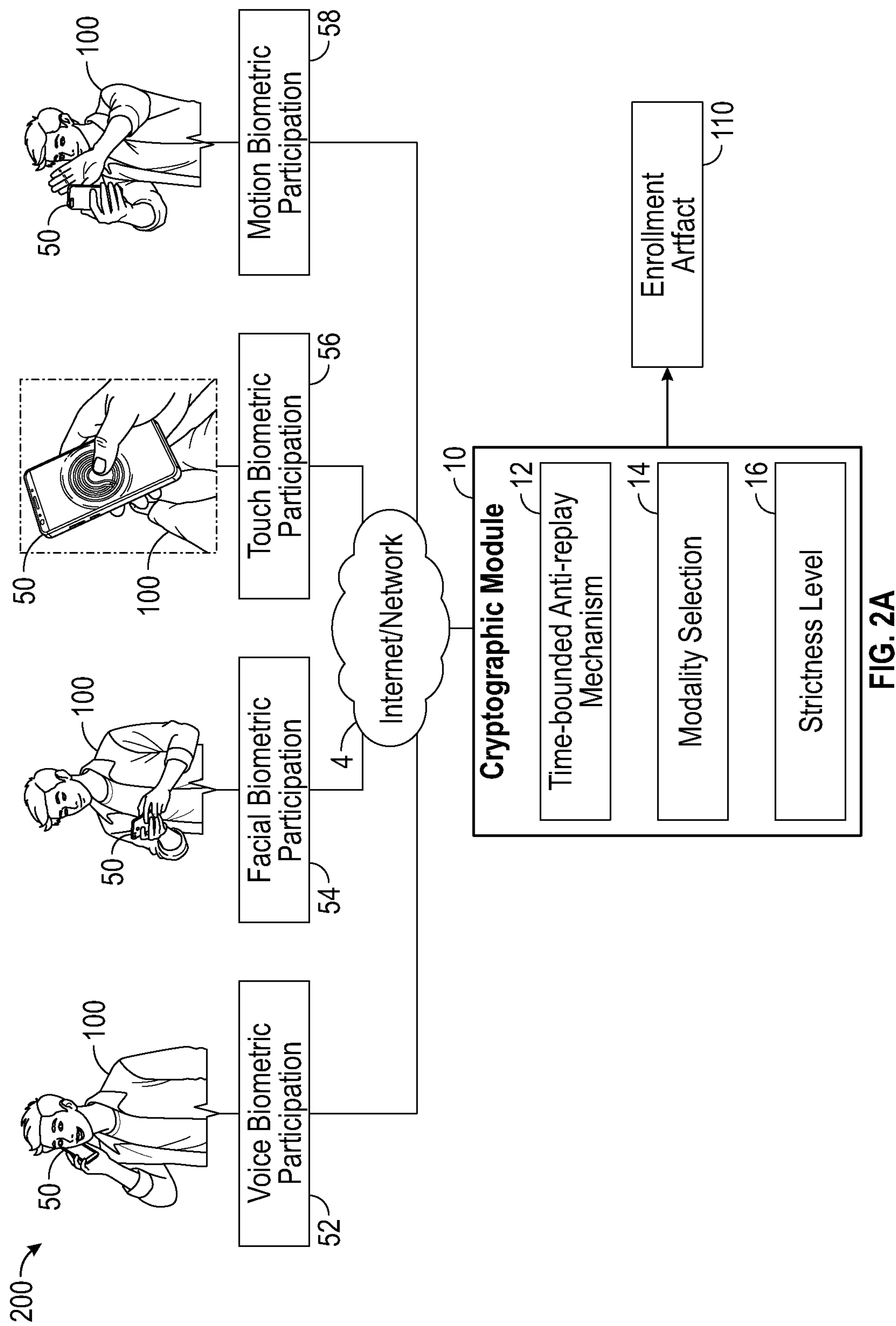
FIG. 2A is a flow chart corresponding to an enrollment process in connection with the authorization system of FIG. 1.
Figure 2B:
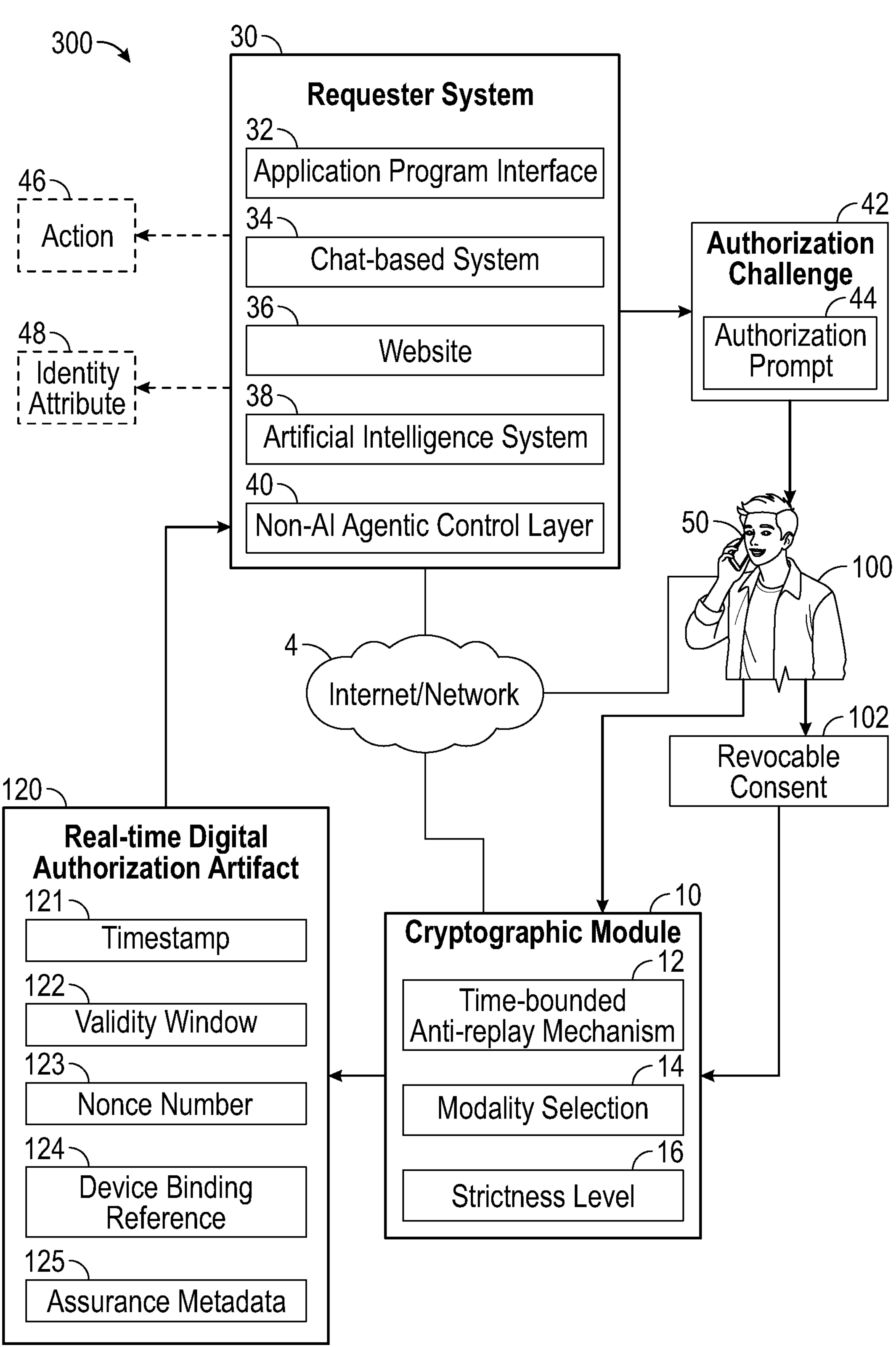
FIG. 2B is a flow chart corresponding to generation, emission, and consumption of a real-time digital authorization artifact in connection with the authorization system of FIG. 1.
Figure 3:
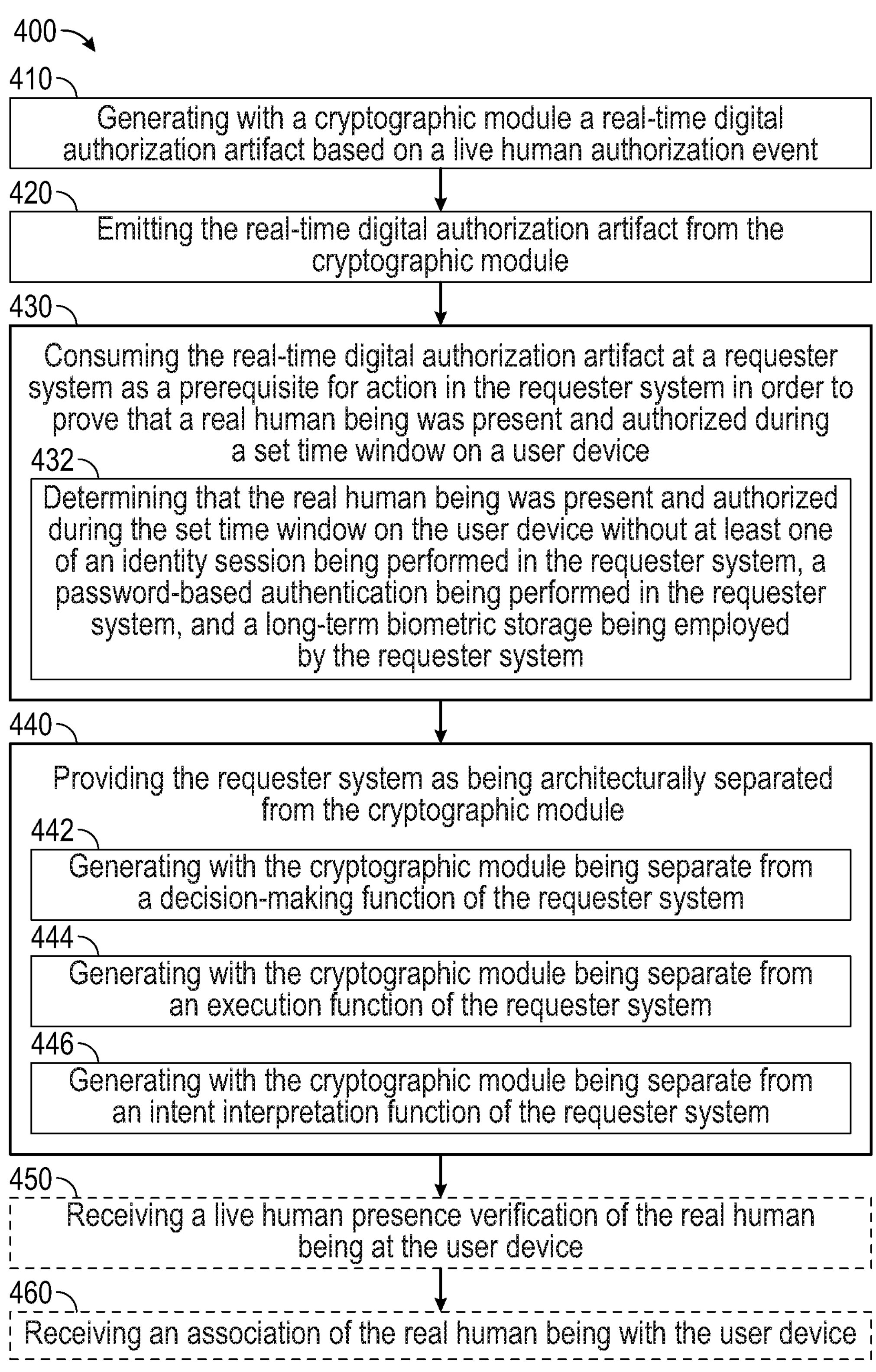
FIG. 3 is a computer-implemented authorization method which may be executed by the authorization system of FIG. 1.

FIG. 2A is a flow chart 200 corresponding to an enrollment process in connection with the authorization system 2 of FIG. 1. FIG. 2B is a flow chart 300 corresponding to generation, emission, and consumption of the real-time digital authorization artifact 120 in connection with the authorization system 2 of FIG. 1. FIG. 3 is a computer-implemented authorization method 400 which may be executed by the authorization system 2 of FIG. 1.

As shown in FIG. 3, the method 400 may include a first step 410 of generating with a cryptographic module 10 a real-time digital authorization artifact 120 based on a live human authorization event, a second step 420 of emitting the real-time digital authorization artifact 120 from the cryptographic module 10, a third step 430 of consuming the real-time digital authorization artifact 120 at a requester system 30 as a prerequisite for the action 46 in the requester system 30 in order to prove that a real human being 100 was present and authorized during a set time window on a user device 50, and a fourth step 440 of providing the requester system 30 as being architecturally separated from the cryptographic module 10. These steps will be more apparent in connection with discussion of FIGS. 2A and 2B.

Referring again to FIG. 2A, during enrollment, the disclosed authorization method 400 further includes a step of generating with the cryptographic module 10 an enrollment artifact 110 before generating with the cryptographic module 10 the real-time digital authorization artifact 120 (FIG. 2B). The enrollment artifact 110 may subsequently serve as reference material, while the real-time digital authorization artifact 120 may be generated per live authorization event.

During such enrollment, the cryptographic module 10 may receive from the user device 50 via the internet/network 4 a number of biometric participations 52,54,56,58 of a real human being 100. The biometric participations 52,54,56,58 may include any one or combination of a voice biometric participation 52, a facial biometric participation 54, a touch biometric participation 56, and a motion biometric participation 58. In response to receiving the biometric participations 52,54,56,58, the cryptographic module 10 may generate the enrollment artifact 110, which may be a digital enrollment artifact 110, and which may later serve as a basis for comparison with the real-time digital authorization artifact 120 (FIG. 2B) in order to prove that the real human being 100 was present and authorized during a set time window on the user device 50. During enrollment, the biometric participations 52,54,56,58 may be signals that are used as comparison material and may not be constituted as authorization or reusable credentials. Enrollment in accordance with the disclosed concept thus may refer to the initial binding of the real human being to the specific user device 50 and the cryptographic module 10, including collection of reference signals used for later comparison, optionally only for later comparison. The requester system 30 may also not be involved in enrollment beyond relying on the resulting enrollment artifact 110 during runtime. More specifically, the requester system 30 may not independently authenticate or authorize the action, but instead may be gated on receiving the real-time digital authorization artifact 120 in response to a live human authorization event on the enrolled user device 50.

Accordingly, the real human being 100 may enroll by, for example and without limitation, enrolling a biometric participation (e.g., without limitation, voice) for live presence verification, optionally enabling additional biometrics via OS frameworks, optionally consenting to disclosure of limited identity attributes (e.g., name, age), and defining standing consent and revocation rules. As will be discussed, a requester may then issue an authorization challenge 42 with nonce, scope, and expiry. The authorization challenge 42 may then be delivered to the user device 50, which may be an enrolled device. Additionally, the user may complete a verification (e.g., live voice verification) and the user device 50 may confirm enrolled owner state and unlock a signing key. Thus, the real-time digital authorization artifact 120 may be based on a live human authorization event and constructed with a timestamp 121, a validity window 122, a nonce number 123, a device binding reference 124, and assurance metadata 125. The real-time digital authorization artifact 120 may also be cryptographically signed and returned to the requester system 30, such that the requester system 30 may verify at least one of freshness, signature, and scope before proceeding.

Referring again to FIG. 2B, during generation, emission, and consumption of the real-time digital authorization artifact 120, the user device 50 may receive the authorization challenge 42 from the requester system 30 before the cryptographic module 10 generates the real-time digital authorization artifact 120. Furthermore, the user device 50 may be configured to control the cryptographic module 10 to generate and emit the real-time digital authorization artifact 120. As shown, the requester system 30 may include any one or combination of an application program interface 32, a chat-based system 34, a website 36, an AI system 38, and a non-AI agentic control layer 40, each of which may be provided with authorization benefits afforded by connection to the cryptographic module 10. In one example, the authorization challenge 42 may include a real-time, dynamically generated authorization prompt 44 to which the real human being 100 may respond within a constrained time window.

More specifically, the method 400 may further include steps of initiating the authorization prompt 44 at the requester system 30, receiving at the user device 50 the authorization prompt 44, which may be configured to require an immediate response from the real human being 100 within a constrained time window, and receiving at the user device 50 the immediate response from the real human being 100 within the constrained time window in response to receiving at the user device 50 the real-time, dynamically generated authorization prompt 44. In one example, the authorization challenge 42 and the authorization prompt 44 may be initiated at the requester system 30, but the authorization prompt 44 may be generated and enforced by the cryptographic module 10, not the requester system 30. That is, in one example substantially all or all security-critical authorization function within the authorization system 2 may reside within the cryptographic module 10. Additionally, in response to receiving the immediate response from the real human being 100, the cryptographic module 10 may generate the real-time digital authorization artifact 120, which may then be consumed by the requester system 30 as a prerequisite for the action 46 in order to prove that the real human being 100 was present and authorized during a set time window on the user device 50.

Accordingly, the authorization prompt 44 may be considered to be modality-agnostic, allowing responses via voice, facial interaction, fingerprint or touch-based interaction, motion, or combinations thereof. An example security property of the authorization system 2 may thus derive from real-time prompting and device possession rather than reliance on any single biometric. Furthermore, it will also be appreciated that behavior of the authorization prompt 44, timing windows, response modalities, and acceptance thresholds may be independently configurable, allowing enforcement behavior to be precisely tuned through parameters for different risk profiles, environments, or deployment contexts without modifying a core logic of the requester system 30.

By consuming the real-time digital authorization artifact 120 as a prerequisite for the action 46, the requester system 30 may advantageously be provided with a number of advantages over known authorization systems (not shown), including that authorization may be performed without an identity session, a password-based authentication, and a long-term biometric storage being employed. The authorization system 2 may thus advantageously avoid password-centric or static credential storage approaches. As a result, and with reference again to FIG. 3, the step 430 may further include a step 432 of determining that the real human being 100 was present and authorized during the set time window on the user device 50 without at least one of an identity session being performed in the requester system 30, a password-based authentication being performed in the requester system 30, and a long-term biometric storage being employed by the requester system 30. Furthermore, generation of the real-time digital authorization artifact 120 with the cryptographic module 10 may be performed without inference from stored enrollment data.

In one example, the authorization prompt 44 may be a system-initiated, unpredictable, and/or non-reusable prompt in order to provide an enforcement mechanism for liveness and replay resistance with respect to generation of the real-time digital authorization artifact 120. The authorization prompt 44 may also be a modality-agnostic prompt in order to allow the immediate response to be provided from at least one of a voice, facial, touch, and motion biometric participation of the real human being 100. Initiating the authorization prompt 44 and receiving at the user device 50 the immediate response may each also be performed in an independently configurable manner in order to allow the real-time digital authorization artifact 120 to be tuned via a number of parameters for at least one of a number of different risk profiles, a number of different environments, and a number of different deployment contexts.

Accordingly, the requester system 30 may send the authorization challenge 42 to the user device 50 of the real human being 100, and the real human being 100 may provide an immediate response, which may include a live human authorization event. For example and without limitation, the user device 50 may receive a live human presence verification of the real human being 100, and the cryptographic module 10 may be configured to receive an association of the real human being 100 with the user device 50. In one example, the live human authorization event may include both the live presence verification and the association of the real human being 100 with the user device 50. Thus, the method 400 may also include a step 450 of receiving a live human presence verification of the real human being 100 at the user device 50, and a step 460 of receiving an association of the real human being 100 with the user device 50.

It will also be appreciated that initiating the authorization prompt 44 and receiving at the user device 50 the immediate response may each be performed without modifying a core logic of the requester system 30. In this manner, and with reference again to FIG. 1, the cryptographic module 10 and the requester system 30 are shown with an architectural separation boundary 6 therebetween in order to reinforce that authorization control in the authorization system 2 may reside entirely within the cryptographic module 10 and not the requester system 30. This is to denote that the cryptographic module 10 may advantageously be architecturally separated from the requester system 30, for example, separate from a decision-making function, execution function, and/or intent interpretation function of the requester system 30. As such, the step 440 in FIG. 3 may further include a step 442 of generating with the cryptographic module 10 separate from a decision-making function of the requester system 30, a step 444 of generating with the cryptographic module 10 separate from an execution function of the requester system 30, and/or a step 446 of generating with the cryptographic module 10 separate from an intent interpretation function of the requester system 30.

Additionally, the cryptographic module 10 may have a modality selection 14 and a strictness level 16. In accordance with the disclosed concept, generating with the cryptographic module 10 the real-time digital authorization artifact 120 may be performed with the modality selection 14 and the strictness level 16 each being policy-configurable and not architecturally fixed with respect to the cryptographic module 10.

In one example, the live human presence verification provided by the real human being 100 during the human authorization event may include a voice biometric participation of the real human being 100, as well as other biometric participations (e.g., without limitation, facial, touch, motion), and these biometric participations may later be compared to the biometric participations 52,64,56,58 provided by the real human being 100 during enrollment.

More specifically, after the cryptographic module 10 generates the real-time digital authorization artifact 120, the requester system 30, from which the authorization challenge 42 originated, may then consume the real-time digital authorization artifact 120. In this regard, the real-time digital authorization artifact 120 may be provided as a runtime artifact, and the runtime artifact may be separate from the enrollment artifact 110, with multiple permissible modalities being configured for runtime authorization (e.g., any combination of voice, facial, touch, motion, or other real-time human signals).

The method 400 may also further include a step of comparing with the requester system 30 the runtime artifact (e.g., the real-time digital authorization artifact 120) to the enrollment artifact 110 in order to prove that the real human being 100 was present and authorized during the set time window on the user device 50. In other words, after the real-time digital authorization artifact 120 is generated, the requester 30 may consume it in order to perform its authorization.

This may include relying on certain aspects of the real-time digital authorization artifact 120 in order to perform the authorization. For instance, the real-time digital authorization artifact 120 may include at least one of a timestamp 121, a validity window 122, a nonce number 123, a device binding reference 124, and assurance metadata 125. These aspects may allow the requester system 30 to verify at least one of a freshness, a signature, and a scope of the real-time digital authorization artifact 120 after consumption at the requester system 30.

As stated above, the requester system 30 may include the AI system 38, which may be any AI system, including an AI agentic system. In this instance, the action 46 may include an invocation of the AI system 38. As such, the method 400 of FIG. 3 may further include at least one of permitting, deferring, and blocking the invocation based on a signal corresponding to at least one of a presence of the live human authorization event, a provenance indicator of the real-time digital authorization artifact 120, a source-of-origin indicator of the real-time digital authorization artifact 120, and/or a scope and/or authority mismatch relative to a context of the invocation. Thus, the requester system 30 may consume the real-time digital authorization artifact 120 without at least one of evaluating semantic content of the requester system 30, detecting an artificial intelligence essence of the requester system 30, and modifying an AI prompt for use in the requester system 30. Accordingly, the disclosed authorization system 2 may provide an improvement over known AI environments (not shown) in which actions may be initiated, chained, or delegated by autonomous systems, making it difficult to establish clear human authorization boundaries and attribution. Specifically, the authorization system 2 may address this gap by treating human authorization itself as a distinct, enforceable system layer that produces a portable authorization event for downstream consumption.

Furthermore, it will also be appreciated that inclusion of the AI system 38 as part of the requester system 30 may be configured for scenarios where consumption of the real-time digital authorization artifact 120 may be required not just for an invocation of the AI system 38, but for subsequent downstream AI or agentic calls that may be triggered by prior AI outputs. In other words, the real-time digital authorization artifact 120 may be enforced as a prerequisite across chained or recursive AI actions.

In such an instance, the method 400 may further include generating an AI output with the AI system 38, and consuming another real-time digital authorization artifact at the requester system 30 as a prerequisite for another invocation of the AI system 38 after generation of the AI output in order to prove that the real human being 100 was present and authorized during another set time window on the user device 50. Accordingly, a new, distinct runtime authorization artifact may be generated for each invocation of the AI system 38 such that runtime artifacts in accordance with one example embodiment of the disclosed concept may never be reused. That is, in recursive or chained AI scenarios, each authorization gate employed may require a separate live human authorization event and a newly generated artifact.

In one example, consuming the real-time digital authorization artifact 120 at the AI system 38 as a prerequisite for invocation of the AI system 38 may provide the AI system 38 with a non-language enforcement mechanism positioned prior to probabilistic model invocation, and this mechanism may be configured to permit, defer, or block invocation based on one or more of signals corresponding to presence of a valid real-time human authorization event, provenance or source-of-origin indicators, detection of recursive or chained AI-to-AI invocation, and scope or authority mismatch relative to a declared invocation context. Consuming the real-time digital authorization artifact 120 at the AI system 38 as a prerequisite for invocation of the AI system 38 may thus not be an evaluation of semantic content, a detection of an AI essence, or a modification of AI prompts, but instead may strictly be a hard pre-invocation gate enforcing invocation eligibility at the system boundary, thereby providing additional insurance and boundary ownership to the AI system 38 rather than a primary value center.

Additionally, in instances where the requester system 30 includes the chat-based system 34, one participant may request real-time authentication from another, and if the recipient is enrolled and consents, the authorization system 2 may generate the real-time digital authorization artifact 120 in order to confirm live human presence and optional identity attributes. If not enrolled or declined, authentication may be unavailable.

Regarding the optional identity attributes, and with reference again to FIG. 2B, the authorization system 2 may optionally disclose a limited identity attribute 48 (e.g., without limitation, name, sex, age) of the real human being 100 only under a standing user consent. As shown in the flow chart 300, the real human being 100 may or may not provide a revocable consent 102 to the cryptographic module 10 before the real-time digital authorization artifact 120 is generated. The revocable consent 102 may be granted once and be revocable, such that revocation may disable attribute disclosure and may also disable participation in systems configured as membership-gated. The method 400 of FIG. 3 may thus further include disclosing the identity attribute 48 (e.g., without limitation, name, age, sex) of the real human being 100 after consuming the real-time digital authorization artifact 120 responsive to the revocable consent 102 being granted to the cryptographic module 10 by the real human being 100.

Depending on context or risk, the authorization system 2 may require any number or combination of live biometric participations (e.g., voice, facial, touch, motion). Furthermore, in terms of anti-replay and liveness, the cryptographic module 10 may include a time-bounded anti-replay mechanism 12 in order to generate the real-time digital authorization artifact 120. The time-bounded anti-replay mechanism 12 may include randomized voice challenges, short validity windows, nonce binding, replay detection, and optional multi-modal liveness checks. Furthermore, it will be appreciated that authorization validity in the authorization system 2 may be conditioned on responsiveness consistent with real-time human interaction, such that responses exhibiting latency inconsistent with physical human participation (e.g., remote synthesis, relay, or injection) may be rejected. That is, in accordance with the disclosed concept latency characteristics may serve as supporting evidence of liveness and non-mediation, alongside the existing time-bounded and anti-replay mechanisms discussed above.

The authorization system 2 may also be configured to provide for failure detection, such that the real-time digital authorization artifact 120 may not be generated if a biometric participation fails, if a confirmation of ownership of the user device 50 fails, if a time window expires, and/or if a policy constraint of the authorization system 2 is violated. It will therefore be appreciated that benefits of the authorization system 2 may lie in treating real-time human authorization as a distinct, enforceable system layer, employing live human presence verification (e.g., via a biometric participation) per authorization event, binding authorization to device context and time, emitting the real-time digital authorization artifact 120 for consumption across the requester system 30, and separating human authorization from decision-making and execution. The authorization system 2 may also be distinguishable over and provide advantages over, for example, passkeys, biometrics, and identity wallets by producing a portable, real-time human authorization event rather than merely authenticating an account or unlocking a device.

Additionally, the authorization system 2 may be guarded against authorization attempts from users other than the real human being 100 and associations other than associations with the enrolled user device 50. For example, the method 400 of FIG. 3 may further include steps of receiving an authorization attempt at the requester system 30 from a second user device, and rejecting the authorization attempt at the requester system 30 because the second user device is not associated with the real human being 100 and/or because the second user device is not the first user device 50. Put differently, the authorization system 2 may reject authorization attempts originating from non-bound or remote devices (e.g., any device other than the enrolled, device-bound user device 50 that may be attempting to originate or relay an authorization event, including proxy, mirrored, replayed, or relayed attempts). An intent in such an instance may be to distinguish mere human presence from correct human authorization. For example, even if a person is present, authorization should fail if that person is not the enrolled, device-associated real human being 100 or is attempting to satisfy the authorization on behalf of another (including under coercion).

Figure 4:
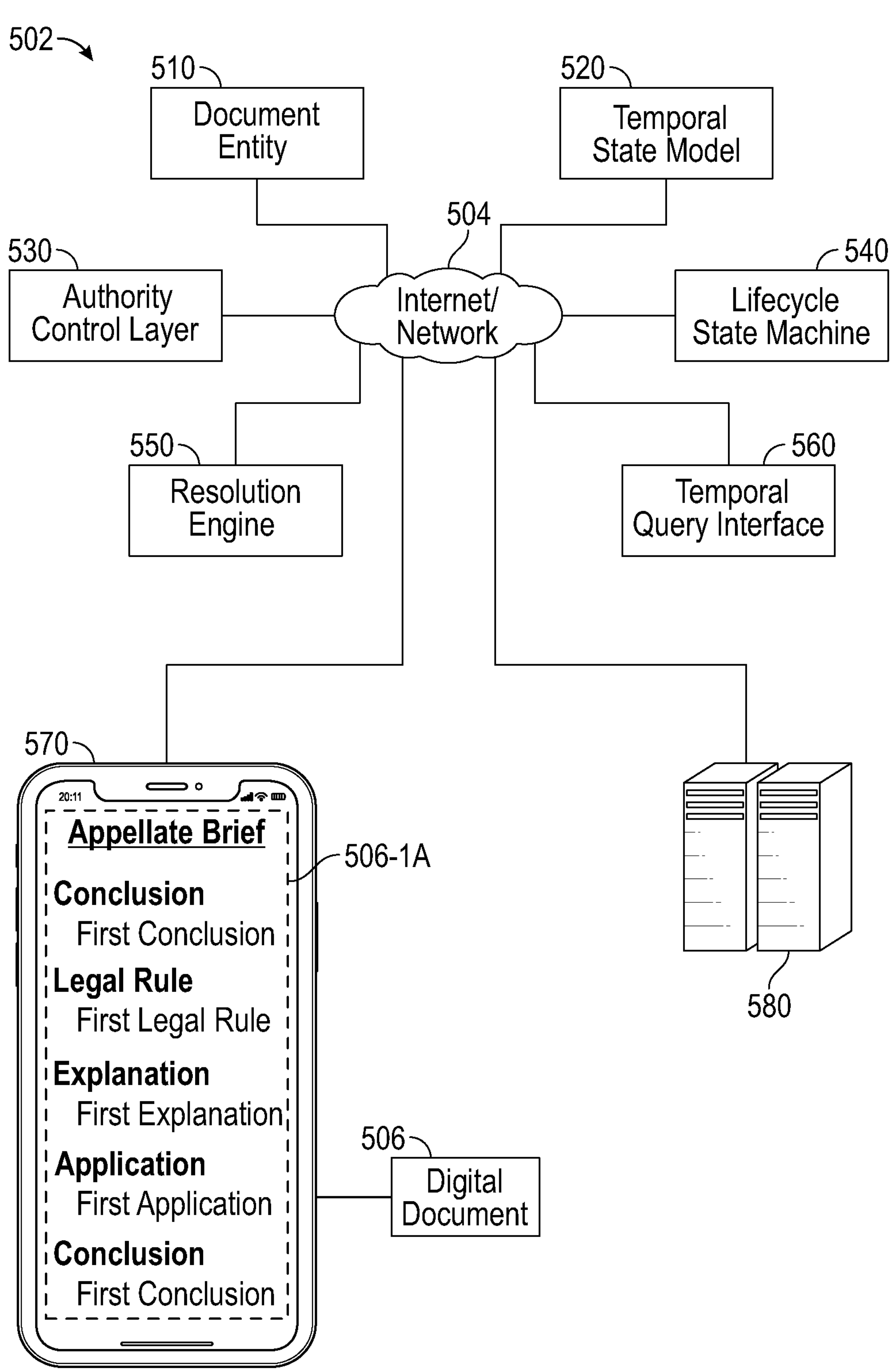
FIG. 4 is a schematic view of an authority binding system for a digital document, shown as employed with the digital document in simplified form, in accordance with one non-limiting embodiment of the disclosed concept.

FIG. 4 shows a schematic view of an authority binding system 502 for a digital document 506, in accordance with one non-limiting embodiment of the disclosed concept. As shown, the system 502 may include a document entity 510, a temporal state model 520, an authority control layer 530, a lifecycle state machine 540, a resolution engine 550, and a temporal query interface 560, each of which may be configured to communicate over an internet/network 504. The system 502 is also shown in FIG. 4 as employed with a user device 570 and a backend server 580, each of which may be configured to communicate with the other elements 510,520,530,540,550,560 of the system 502 over the internet/network 504. Moreover, in FIG. 4 the user device 570 is displaying a first malleable representation 506-1A of the digital document 506.

As will be discussed in greater detail below, the system 502 may be configured to create, maintain, and present the digital document 506, whose authoritative state may be explicitly bound to time and controlled authority, rather than to mutable versions, duplicated copies, or collaborative edit histories. In order to perform these functions, the system 502 may be configured such that time may be a first-class, enforceable primitive of the digital document 506 itself.

In accordance with the disclosed concept, at any moment the digital document 506 may have a single authoritative current state, and a set of authoritative historical states that can be referenced, viewed, or verified without copying or branching. Unlike traditional documents, the digital document 506 being employed by the system 502 may not rely on version duplication, manual saving, forks, or informal edit histories to establish truth or authority. Instead, the digital document 506 may have a state that is addressable and verifiable by time.

Figure 5:
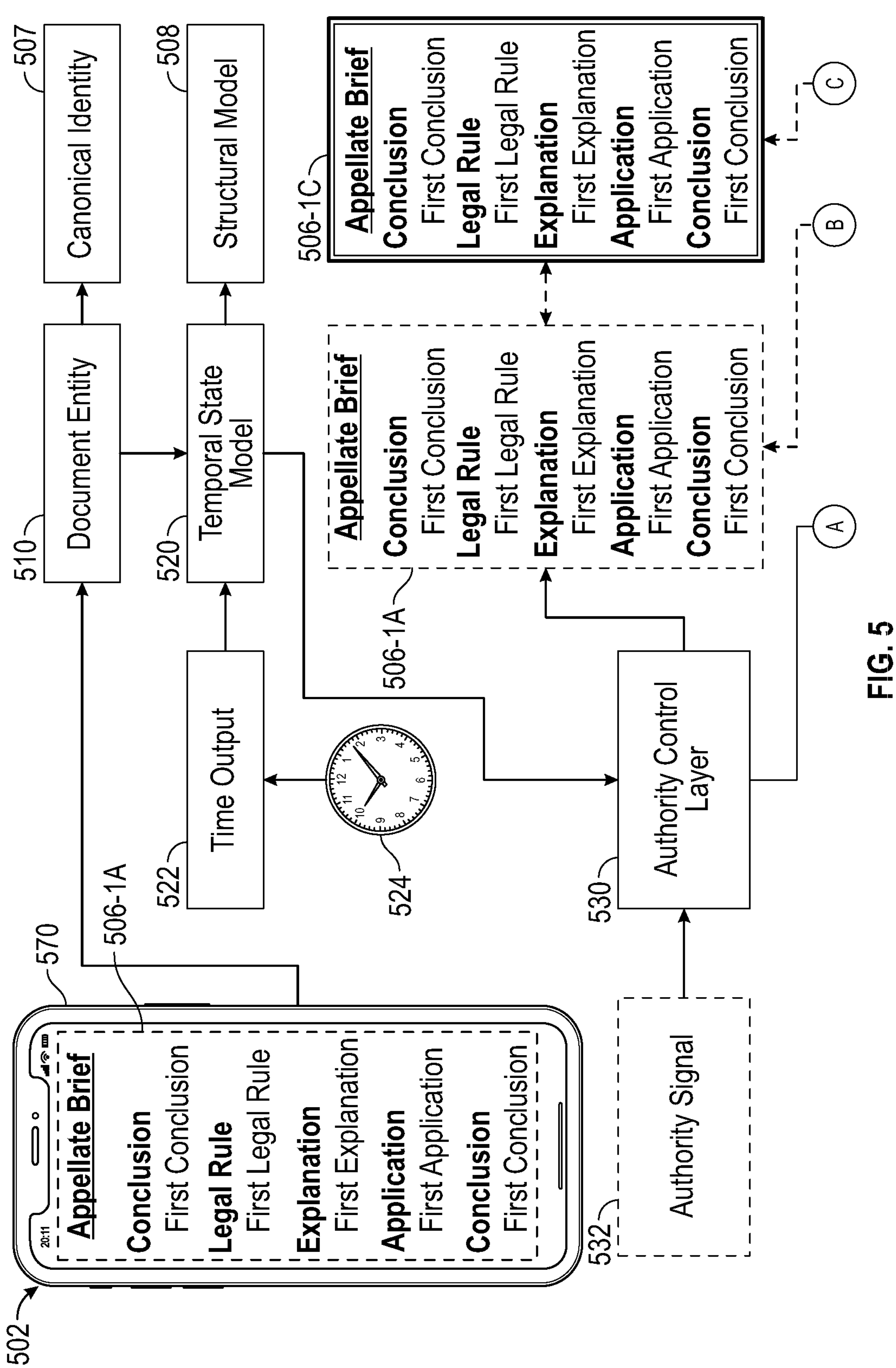
FIG. 5 is a flow view of the authority binding system of FIG. 4, shown as employed with other aspects in simplified form, in accordance with one non-limiting embodiment of the disclosed concept.
Figure 5:
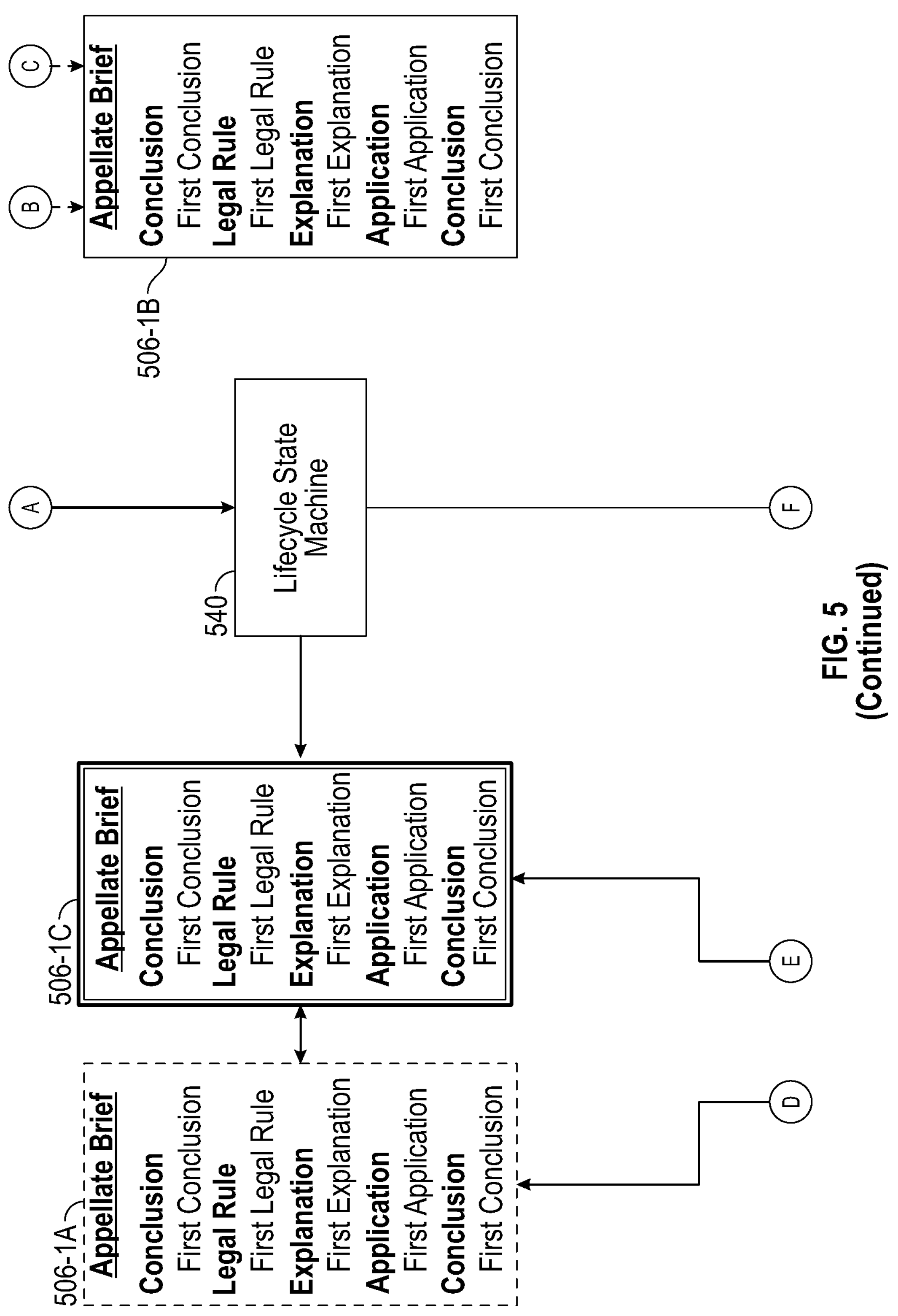
Figure 5:
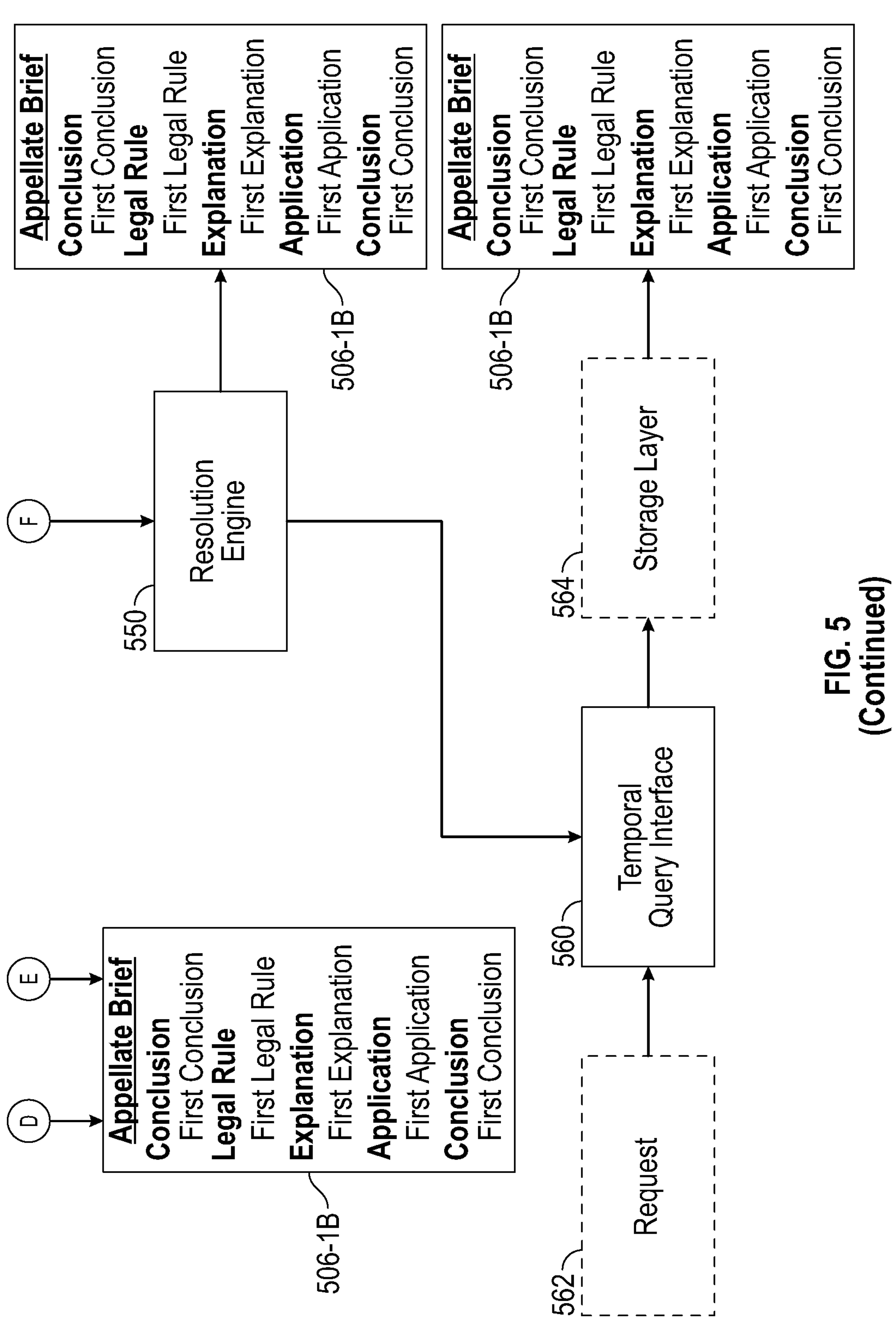

FIG. 5 shows another view of the system 502. As shown, the document entity 510 may be configured to represent the digital document 506 as a canonical identity 507 that persists across time, and the temporal state model 520 may be configured to receive the digital document 506 from the document entity 510, receive a time output 522 from a clock 524 (e.g., without limitation, any system-provided or external time source capable of producing the time output 522, including a system clock, an operating-system clock, a network-synchronized clock, and/or another reliable time source), and bind an authoritative state of the digital document 506 to the time output 522 such that the time output 522 may be part of a structural model 508 of the digital document 506.

By stating that the time output 522 may be part of the structural model 508 of the digital document 506, corresponding time coordinates 523 (FIG. 8) generated from the time output 522 may not merely be metadata, a label, or an annotation. Instead, the time output 522 may be incorporated into a lifecycle structure of the digital document 506 such that authoritative state transitions may be indexed, bounded, and resolved using the time output 522. Moreover, access to authoritative document content may be deterministically resolved by reference to the time output 522. In other words, the time output 522 may participate directly in how the system 502 defines, enforces, and retrieves authoritative document states. It will also be appreciated that the document entity 510 may be further configured to represent the digital document 506 as a multi-author digital document having the authoritative state at any moment in time. Moreover, the temporal state model 520 may be further configured to bind the authoritative state of the digital document 506 to the time output 522 without layering an annotation on top of the digital document 506.

Furthermore, the authority control layer 530 may be configured to govern the authoritative state by a number of time-bound lifecycle state transitions of the digital document 506. In this regard, in one example only verified authority events may trigger lifecycle state transitions (e.g., freeze, unfreeze, seal). The lifecycle state machine 540 may also be configured to structurally enforce the number of time-bound lifecycle state transitions of the digital document 506. To illustrate, FIG. 5 depicts the first malleable representation 506-1A of the digital document 506, as well as a first fixed representation 506-1B of the digital document 506 and a first absolute representation 506-1C of the digital document 506, shown as being governable by the authority control layer 530 via dashed transition lines, and being structurally enforceable by the lifecycle state machine 540 via solid transition lines.

Continuing to refer to FIG. 5, the resolution engine 550 may be configured to close a number of temporal windows of mutability of the digital document 506 in order to execute the number of time-bound lifecycle state transitions. In this regard, finality may be intentional, attributable, time-bound, and system-enforced rather than socially inferred.

Furthermore, the temporal query interface 560 may be configured to resolve requests to access the digital document 506 when the number of temporal windows of mutability of the digital document 506 are closed by the resolution engine 550. See, for example, a transition to the first fixed representation 506-1B of the digital document 506 having been executed by the resolution engine 550. Additionally, the temporal query interface 560 is shown in FIG. 5 in association with a storage layer 564 to denote that the system 502 may support persistent state representation.

Accordingly, the document entity 510 may provide a single canonical anchor for the system 502, the temporal state model 520 may bind document truth to the time output 522, the authority control layer 530 may govern when lifecycle transitions may occur, the lifecycle state machine 540 may enforce those transitions structurally, the resolution engine 550 may close temporal windows of mutability, and the temporal query interface 560 may deterministically resolve truth at any point in time. Truth in this regard may be an emergent property resulting from the canonical identity 507, a singular authoritative state at any moment in time, a number of authority-bound lifecycle transitions, a structural enforcement of mutability termination, and/or a deterministic temporal retrieval.

Each of the elements 510,520,530,540,550,560 of the system 502 may thus operate independently but together correspond to the system 502 being a unified system that enforces a single authoritative document state at any moment. In accordance with the disclosed concept, the time output 522 may be incorporated into the structural model 508 of the digital document 506, not merely recorded as metadata, timestamps, audit logs, or version history. Furthermore, authoritative state may be defined by time-bound lifecycle transitions, not by retrieving stored copies, reconstructing versions, or relying on external process. Additionally, finality in the system 502 may be optional and intentional such that the digital document 506 may remain editable indefinitely unless and until an authorized authority event explicitly terminates mutability.

More specifically, the document entity 510 may function to maintain the canonical identity 507 of the digital document 506 throughout its lifecycle and across all state transitions. In this regard, the canonical identity 507 may serve as a primary object operated on by the temporal state model 520, the authority control layer 530, the lifecycle state machine 540, the resolution engine 550, and the temporal query interface 560. All authoritative states may thus, in one example, be associated with the canonical identity 507.

Moreover, the temporal state model 520 may maintain the authoritative historical state lineage, receive transition signals from the lifecycle state machine 540 and the resolution engine 550, and provide authoritative state mapping used by the temporal query interface 560 to deterministically resolve document content at a specified time. Furthermore, the authority control layer 530 may verify and validate authority signals that permit lifecycle state transitions. Authority may be evaluated independently of participation, access permissions, or workflow roles. In terms of interoperability, the authority control layer 530 may signal the lifecycle state machine 540 and the resolution engine 550 when authorized lifecycle transition events occur, including freeze, unfreeze, and sealing events. Also, the lifecycle state machine 540 may define and enforce valid lifecycle states and permissible transitions between them, and may prevent unauthorized or invalid lifecycle transitions. In terms of interoperability, the lifecycle state machine 540 may receive authority validation signals from the authority control layer 530, may control transition events executed by the resolution engine 550, and may govern document mutability state enforcement. The resolution engine 550 may operate as the actuator of lifecycle transitions, work under enforcement rules defined by the lifecycle state machine 540 and the authority control layer 530, and signal the temporal state model 520 to record authoritative state boundaries and provide boundary markers used by the temporal query interface 560. Additionally, the temporal query interface 560 may allow retrieval of authoritative document content at a specific time without requiring version duplication or branching, and may query the temporal state model 520 and authoritative state lineages to resolve access requests.

In accordance with the disclosed concept, the digital document 506 may have a single authoritative state at any given moment, and historical states of the digital document 506 may be immutable once passed. Furthermore, authority to modify, freeze, or unlock the digital document 506 may be explicitly governed by the authority control layer 530. In this regard, the time output 522 may not be metadata, but instead may be part of the structural model 508 of the digital document 506. As a result, the digital document 506 may be referenced by timestamp, viewing a past state may not create a copy of the digital document 506, and historical states of the digital document 506 may be retroactively altered.

It will also be appreciated that one or more authorized parties may have permission to modify the digital document 506, and authority may include the ability to edit, freeze (e.g., without limitation, lock), unfreeze, or permanently seal a document. Moreover, authority rules may be enforced by the system 502, as opposed to social convention. Accordingly, the disclosed system 502 may thus replace reliance on organizational policies, user agreements, workflow completion signals, and/or interface-based status indicators, and instead provide for system-enforced lifecycle transitions that mechanically terminate mutability. Additionally, the system 502 may be configured such that the digital document 506 may be frozen at a specific moment, and once frozen, the digital document 506 may become immutable. Freeze events in this regard may be temporary, conditional, or permanent, and freeze authority may be unilateral or multi-party.

It will also be appreciated that the digital document 506 may always be accessed via the same surface (e.g., URL, identifier), and the system 502 may determine which state may be presented based on time and authority. Beneficially, the system 502 may be configured such that there may be no divergent "copies" representing the same document. Furthermore, if editing resumes after a freeze (where permitted), the system 502 may clearly delineate the frozen state, and subsequent states. A lineage of the digital document 506 may thus remain continuous and non-forking.

The system 502 may thus be distinct from known systems (not shown) in that the system 502 may not provide for traditional version control, collaborative documents with edit history, static documents with revisions, or databases with record timestamps. That is, the system 502 may not provide for branching or parallel truths, or reliance on version copies, but may instead provide for explicit authority enforcement, and time as a governing dimension.

The system 502 may thus be particularly suitable for legal agreements whose authoritative language must be referenced as of a specific date, for technical specifications that evolve but require immutable historical states, for investment materials that must show what was known when decisions were made, for policies or disclosures where retroactive modification is prohibited, as well as any context where "what did this say at that time?" must have a definitive answer.

Regarding implementation of the system 502, the digital document 506 may be implemented as a unique addressable entity (e.g., domain, identifier, resource), state transitions (e.g., without limitation, between the malleable, fixed, and absolute states) may be system-mediated, historical states may be preserved without duplication, and presentation may resemble a document, a web page, or another readable surface. The system 502 may thus be configured to be agnostic to storage, user interface (UI), and transport mechanisms, with an example advantage being that time and authority may be enforceable primitives of an existence of the digital document 506, rather than as annotations layered on top of mutable files. As a result, the system 502 may be configured for time-addressable document state, authority-enforced document mutability, freeze and lock mechanisms tied to document state, and presentation of authoritative historical states without duplication.

Figure 6:
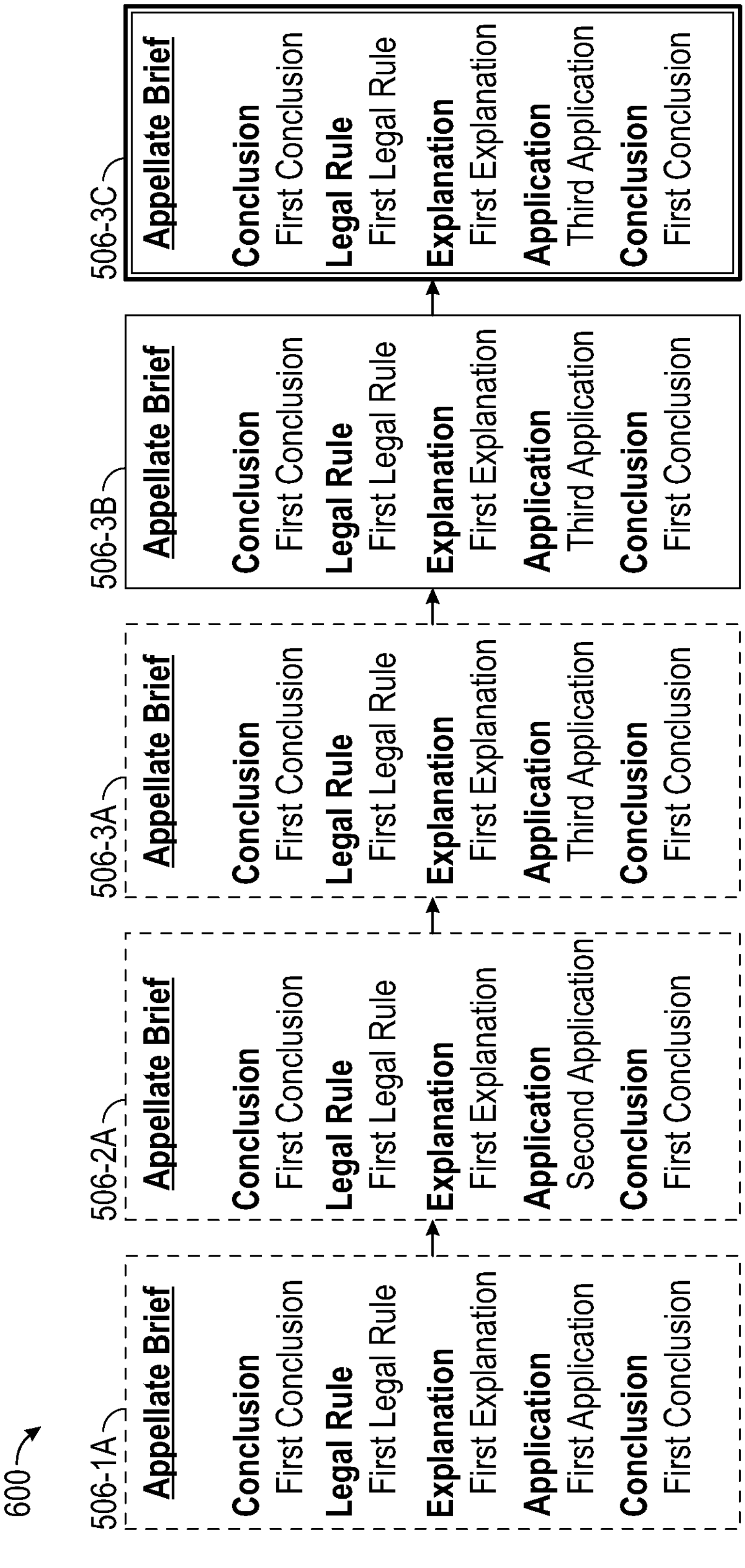
FIG. 6 is a flow chart corresponding to lifecycle transitions of the digital document, in accordance with one non-limiting embodiment of the disclosed concept.

FIG. 6 shows a flow chart 600 corresponding to lifecycle transitions of the digital document 506, in accordance with one non-limiting embodiment of the disclosed concept. More specifically, FIG. 6 shows first, second, and third malleable representations 506-1A,506-2A,506-3A of the digital document 506, which may correspond to one user or multiple users having made edits to the digital document 506 (e.g., the first, second, and third malleable representations 506-1A,506-2A,506-3A are all different from one another). Additionally, FIG. 6 also depicts two time-bound lifecycle state transitions of the digital document 506, first as a transition from the third malleable representation 506-3A to a third fixed representation 506-3B, and second from the third fixed representation 506-3B to a third absolute representation 506-3C.

Accordingly, it will be appreciated that the lifecycle states (malleable, fixed, absolute) may describe the mutability conditions under which the digital document 506 exists, while the aforementioned authoritative state may be the single document state that may be designated as authoritative at a given time coordinate. In one example, the number of time-bound lifecycle state transitions of the digital document 506 may include transitions between a malleable state corresponding to the digital document 506 being modifiable (e.g., without limitation, editable), a fixed state corresponding to the digital document 506 being preserved at a specific moment in time, and an absolute state corresponding to the digital document 506 being permanently finalized.

More specifically, in the malleable state, the authoritative state may be provisional and may change over time as edits occur. Furthermore, when a fixed state is entered, the authoritative state at that time coordinate may be preserved as an authoritative temporal boundary. Likewise, when the absolute state is entered, the authoritative state at that time coordinate may become permanently authoritative, and no further authoritative states may be created for the digital document 506. In short, the lifecycle states (e.g., malleable, fixed, absolute) may govern whether and how the authoritative state may change, while the authoritative state may be what the system 502 returns as truth when queried at a specific time. As such, the lifecycle states (e.g., malleable, fixed, absolute) may explain when binding may occur, when it may be suspended, and when it may be permanently closed, but they may not replace the authoritative state, but instead control its evolution. In one example, authoritative document truth may be established in the system 502 by structural lifecycle state transitions rather than by descriptive metadata, stored version histories, or workflow completion signals. The system 502 may thus mechanically enforce authoritative state boundaries through enforcement of the lifecycle state machine 540 and execution of the resolution engine 550.

In one example, the temporal state model 520 may be further configured to bind the authoritative state such that the authoritative state may be a single authoritative state of the digital document 506 at any moment in time, and/or such that the time output 522 is not metadata. It will also be appreciated that the temporal state model 520 may be further configured to index the authoritative state by a number of time coordinates without binding the authoritative state by at least one of, or any of, a number of version numbers of the digital document 506, a number of copies of the digital document 506, and a number of parallel authoritative document lineage branches (e.g., forks) derived from the canonical identity 507.

Indexing an authoritative state in this regard may refer to associating a document state with a temporal coordinate such that authoritative document content may be retrievable using time reference rather than version identifiers, stored copies, or manual edit histories. Furthermore, the lifecycle state machine 540 may be further configured to structurally enforce the number of time-bound lifecycle state transitions of the digital document 506 without employing at least one of, or each of, a permission change mechanism, a user interface lock mechanism, and a workflow label mechanism.

Referring again to FIG. 5, the number of time-bound lifecycle state transitions may be configured to be triggered in the lifecycle state machine 540 in response to the authority control layer 530 receiving an authority signal 532, and independent of an editing action with respect to the digital document 506. Additionally, the resolution engine 550 may be further configured to close the number of temporal windows of mutability of the digital document 506 upon receipt of the authority signal 532 at the authority control layer 530.

In one example, the closing of temporal windows by the resolution engine 550 may be the operational mechanism that executes lifecycle state transitions authorized by the authority control layer 530 and enforced by the lifecycle state machine 540. When the temporal windows close, the temporal state model 520 may record the authoritative boundary, the lifecycle state machine 540 may enforce mutability termination, and the temporal query interface 560 may use these boundaries to resolve authoritative document states. This may create a closed control loop linking authority validation, lifecycle enforcement, state boundary creation, and authoritative state retrieval. As such, each of the elements 510,520,530,540,550,560 may function together to provide the system 502 as being a closed-loop control system governing document mutability, authority enforcement, lifecycle transitions, and temporal truth verification.

Figure 7:
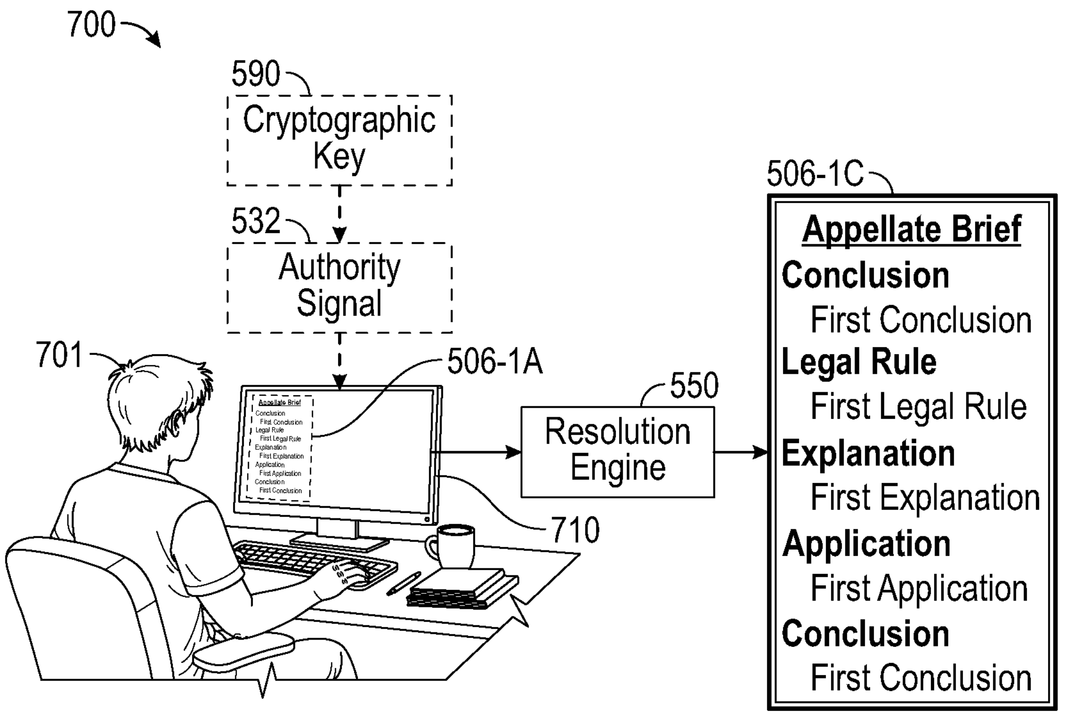
FIG. 7 is a workspace environment for the digital document, showing multi-party interaction versus authority separation, in accordance with one non-limiting embodiment of the disclosed concept.
Figure 7:
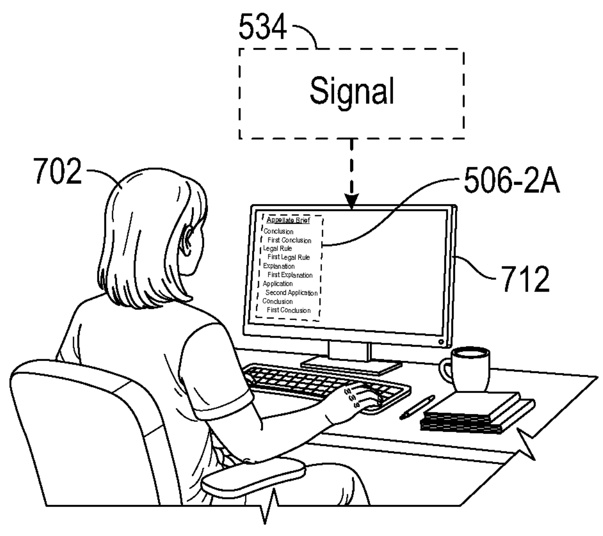

FIG. 7 shows a workspace environment 700 showing multi-party interaction with respect to the digital document 506 versus authority separation with respect to the digital document 506. More specifically, FIG. 7 shows a first author 701 and a second, different author 702 each interacting with (e.g., without limitation, editing) the digital document 506 on a corresponding user device (e.g., first computer 710 and second computer 712). As shown, the first computer 710 is depicting the first malleable representation 506-1A of the digital document 506 and the second computer 712 is depicting the second malleable representation 506-2A of the digital document 506.

In one example, the first author 701 may be configured to close a temporal window of mutability of the digital document 506, and the second author 702 may not. As stated above, the document entity 510 may represent the digital document 506 as a multi-author digital document having the authoritative state at any moment in time. The system 502 may also be configured to receive a plurality of interactions with respect to the digital document 506 from each of the first author 701 and the second author 702, and determine to close the temporal windows of mutability of the digital document 506 responsive to receiving the authority signal 532 at the authority control layer 530 from the first author 701, and to not close the number of temporal windows of mutability of the digital document 506 responsive to receiving another signal 534 at the authority control layer 530 from the second author 702 because the first author 701 is an authorized authority and the second author 702 is not. This is depicted in FIG. 7 via the first author 701 causing the authority signal to be received at the authority control layer 530, which in turn causes the resolution engine 550 to close the temporal windows of mutability of the digital document 506. See, for example, the first malleable representation 506-1A transitioning to the first absolute representation 506-1C. Accordingly, in one example only a verified authority signal (e.g., the authority signal 532) may cause the resolution engine 550 to close a temporal window of mutability. An unauthorized signal (e.g., the signal 534) may not trigger a state transition, even though the sender may otherwise be a participant to interaction with the digital document 506.

As such, the resolution engine 550 may be configured to close the temporal windows of mutability of the digital document 506 responsive to at least one authorized party (e.g., the first author 701) executing a state transition of the digital document 506. Beneficially, the resolution engine 550 may be configured to close the temporal windows of mutability of the digital document 506 without reliance on at least one of, or each of, an organizational policy, a user agreement, a workflow completion signal, and an interface-based status indicator. FIG. 7 thus illustrates an authority verification and transition process provided for by the system 502 in which the authority signal 532 is received, the authority control layer 530 verifies authorization, the lifecycle state machine 540 validates allowable transition, the resolution engine 550 closes a mutability window, the temporal state model 520 binds authoritative state to the time output 522, and the temporal query interface 560 updates authoritative retrieval index.

Figure 8:
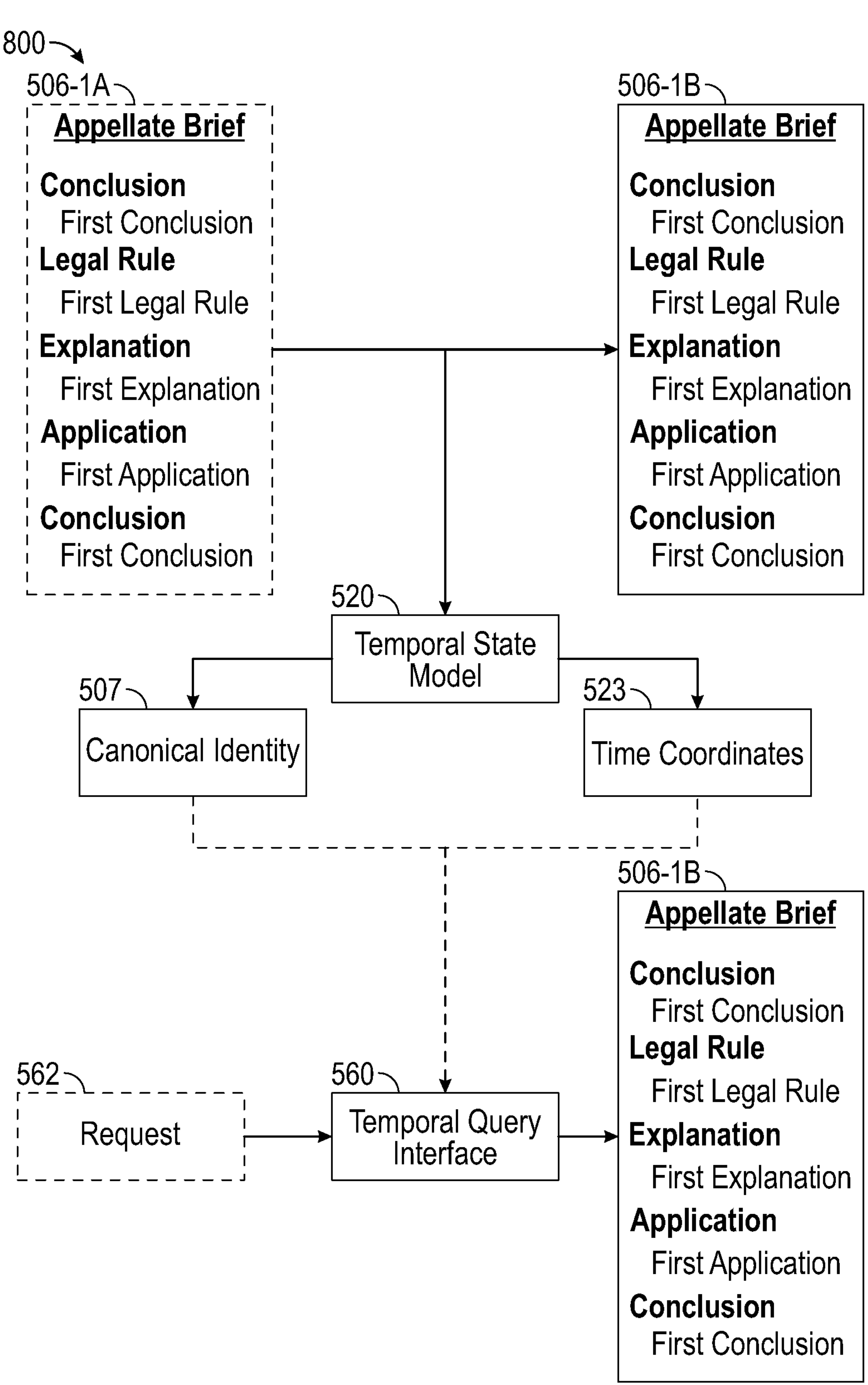
FIG. 8 shows a deterministic retrieval process for the digital document which is provided for by portions of the system of FIGS. 4 and 5, in accordance with one non-limiting embodiment of the disclosed concept.

FIG. 8 shows a deterministic retrieval process 800 for the digital document 506 provided for by portions of the system 502. As shown, the first malleable representation 506-1A of the digital document 506 has transitioned to the first fixed representation 506-1B. In this manner, the temporal state model 520 may be further configured to generate a number of time coordinates 523 from the time output 522, and the temporal query interface 560 may be further configured to resolve a request 562 to access the digital document 506 by employing the time coordinates 523. The time coordinates 523 may be generated during lifecycle transitions and authority events, may serve as structural state markers that define authoritative document boundaries, and may be normalized or generated from the time output 522. In one example, the time coordinates 523 may not be a version label or copy reference, but instead may be a temporal index into a single canonical document lineage.

For example, the canonical identity 507 and the time coordinates 523 may be input into the temporal query interface 560, and in response, the temporal query interface 560 may output an authoritative document state existing at a moment in time immediately after the transition from the malleable state to the fixed state. Note the transition from the first malleable representation 506-1A to the first fixed representation 506-1B at the top of FIG. 8, and in response, the first fixed representation 506-1B provided for by the temporal query interface 560. Accordingly, the temporal query interface 560 may return the authoritative document state that existed at the specified time without duplication, reconstruction, or branching. FIG. 8 thus illustrates that the system 502 contemplates non-duplication retrieval and canonical lineage enforcement.

Figure 9:
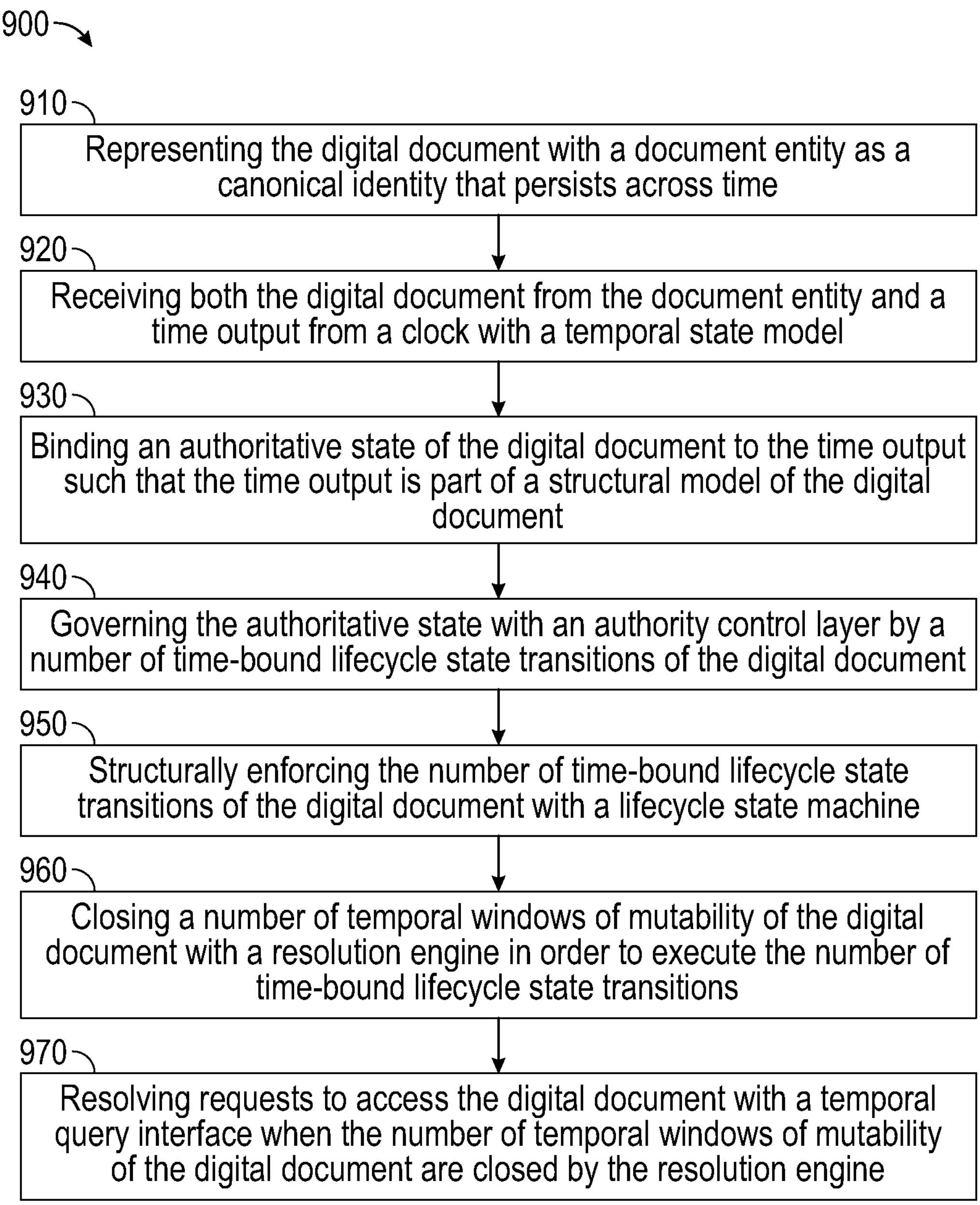
FIG. 9 shows a flow chart of an authority binding computer-implemented method for the digital document, in accordance with one non-limiting embodiment of the disclosed concept.

FIG. 9 shows a flow chart corresponding to an authority binding computer-implemented method 900 for a digital document. In one example, the method 900 comprises a first step 910 of representing the digital document 506 with a document entity 510 as a canonical identity 507 that persists across time; a second step 920 of receiving both the digital document 506 from the document entity 510 and a time output 522 from a clock 524 with a temporal state model 520; a third step 930 of binding an authoritative state of the digital document 506 to the time output 522 such that the time output 522 is part of a structural model 508 of the digital document 506; a fourth step 940 of governing the authoritative state with an authority control layer 530 by a number of time-bound lifecycle state transitions of the digital document 506; a fifth step 950 of structurally enforcing the number of time-bound lifecycle state transitions of the digital document 506 with a lifecycle state machine 540; a sixth step 960 of closing a number of temporal windows of mutability of the digital document 506 with a resolution engine 550 in order to execute the number of time-bound lifecycle state transitions; and a seventh step 970 of resolving requests to access the digital document 506 with a temporal query interface 560 when the number of temporal windows of mutability of the digital document 506 are closed by the resolution engine 550.

In one example, the third step 930 may be performed without auxiliary data being a governing dimension of the digital document 506. Moreover, the method 900 may further include a step of constantly providing the authoritative state to the digital document 506 after binding the authoritative state of the digital document 506 to the time output 522 with the temporal state model 520, as well as a step of providing the number of time-bound lifecycle state transitions of the digital document 506 as transitions between a malleable state corresponding to the digital document 506 being modifiable, a fixed state corresponding to the digital 6 being preserved at a specific moment in time, and an absolute state corresponding to the digital document 506 being permanently finalized. It will also be appreciated that the method 900 may further include a step of receiving an authority signal 532 at the authority control layer 530, and a step of triggering the number of time-bound lifecycle state transitions in the lifecycle state machine 540 in response to the authority control layer 530 receiving the authority signal 532, and independent of an editing action with respect to the digital document 506.

In this regard, the method 900 may further include a step of sending the authority signal 532 to the authority control layer 530 from an authorized cryptographic key 590 in order to cause the resolution engine 550 to close the number of temporal windows of mutability of the digital document 506. The method 900 may also further include a step of indexing the authoritative state with the temporal state model 520 by a number of time coordinates 523 without binding the authoritative state by at least one of, or all of, a number of version numbers of the digital document 506, a number of copies of the digital document 506, and a number of parallel authoritative document lineage branches derived from the canonical identity 507. Furthermore, it will be appreciated that the method 900 may also include steps corresponding to any of the functionality of the system 502, discussed above. It will also be appreciated that the user devices 570,710,712 disclosed herein may each include a corresponding processor and a corresponding memory having instructions that, when executed by the processor, cause the processor to perform the method 900.

Accordingly, the disclosed system 502 and method 900 may advantageously provide a temporal anchoring and sequencing mechanism that records when authoritative states occur, and may also ensure that downstream systems do not treat time-dependent events as interchangeable or retroactively mutable. The disclosed system 502 and method 900 may therefore not be a scheduler or logging system in the conventional sense, but instead may have as a function the binding of authority to time.

In one example, when a system other than the system 502 fixes agreed constraints into an authoritative, machine-enforceable form, the system 502 may record the moment of imprint. It will be appreciated that this timestamp may not merely be metadata, but instead the timestamp may become part of the authoritative context of the rule. In this regard, downstream systems may reference not just what rule was imprinted, but when such a rule became authoritative. In effect a rule may not be valid "in the abstract", but may instead be valid from a specific point in time forward.

Additionally, other systems besides the system 502 may include or reference an entry of the digital document 506, which may indicate a time of imprint, a version boundary, and/or a sequence position relative to other rules or actions. As a result, later components may be prevented from treating older rules as if they were contemporaneous with newer ones.

Furthermore, it will also be appreciated that other systems besides the system 502 may freeze content of a rule, and the system 502 may freeze a temporal boundary of that rule. Together, such a system may prevent retroactive reinterpretation, backdating of authority, and/or substitution of "earlier" or "later" rules to justify actions. In this regard, a combined system in accordance with the disclosed concept may include other systems that answer the question "what cannot change," in addition to the system 502 which may answer the question "when that 'what' became binding."

Moreover, the system 502 may also be employed in combination with another system that presents actions for evaluation alongside a locked rule artifact. In this regard, the system 502 may provide a reference indicating when the rule became authoritative. This may ensure that an agent cannot cite a rule that did not yet exist, rely on a rule that was superseded, and/or collapse temporal ordering into a single abstract policy state. Such behavior may be inherently agentic, because the agent's action proposal may be evaluated in a temporal context, not just a logical one.

Moreover, the system 502 may also be employed in combination with another system that performs binary enforcement (allow and block). In this regard, the system 502 may function to allow the gate to evaluate whether the proposed action is temporally valid and/or whether the rule being cited was authoritative at the time of action. Doing so may advantageously prevent "after-the-fact justification" or post hoc rule alignment.

Accordingly, it will be appreciated that the system 502 may not be a passive storage, but may instead actively participate in action evaluation by constraining which rules are eligible for enforcement, enforcing ordering between agreement, authority, and execution, and preventing agents from operating outside a coherent temporal frame. In other words, an agent may not be permitted to act unless a rule existed, unless a rule was imprinted before the action, unless a rule remained locked, and unless a rule was temporally applicable. As a result, the system 502 may be placed squarely in the agentic enforcement chain, not as infrastructure but as a control primitive.

It will also be appreciated that a core aspect of the system 502 may be intentional finality enforced by authority, meaning that an authorized party (or parties) may explicitly freeze or permanently seal a document state, at which point mutability may be structurally terminated by the system 502 rather than socially or procedurally. In other words, the system 502 may support controlled evolution until authority explicitly ends it, with finality enforced mechanically, not by convention.

Moreover, an important aspect of the system 502 may be that document mutability may be governed by explicit, authority-controlled state transitions, rather than continuous editability or static immutability. Specifically, the system 502 may enforce that the digital document 506 may be editable until an authorized party (e.g., the first author 701 in FIG. 7) executes a freeze event, which may be a formal state transition rather than a permission toggle. Authority to freeze, unfreeze, or permanently seal the digital document 506 may be delegated to another party, including multi-party or conditional authority. Freeze and seal events may also be part of the canonical lifecycle of the digital document 506 and may be preserved as authoritative temporal boundaries. Once the digital document 506 is permanently sealed by an authorized party (e.g., the first author 701), its state at that moment may become the definitive authoritative version, while all prior states may remain addressable and inspectable without duplication or branching. Accordingly, in one example at no point may multiple parallel authoritative versions exist. Instead, the system 502 may enforce a single canonical truth at any given time. Therefore, an important aspect of the disclosed concept may be that authority to end mutability and time-bound finality are enforceable primitives of the digital document 506 itself, rather than access control rules, version metadata, or social process.

In terms of how the system 502 functions, in one example, behavior of the digital document 506 may be governed by an explicit finite state machine, rather than by continuous editability or static immutability. Specifically, the system 502 may define and enforce distinct lifecycle states for a document, including but not limited to the malleable state, the fixed state, and the absolute state, each of which have been discussed above. More specifically, the malleable state may also correspond to the digital document 506 being modified, including by multiple participants, subject to authority rules; the fixed state may also correspond to the state of the digital document 506 at a specific time being preserved as an authoritative temporal boundary, with mutability suspended; and the absolute state may also correspond to the state of the digital document 506 being permanently finalized, and mutability being structurally terminated.

Transitions between these states may be formal state transitions (e.g., without limitation, not permission changes or user interface locks), and may be preserved as part of the canonical lifecycle of the digital document 506. In addition, the system 502 may treat document state as temporally addressable rather than versioned. The system 502 may resolve document access requests based on the canonical identity 507 and the time coordinates 523, returning the authoritative document state that existed at that moment, regardless of when the request 562 is made. Historical states may be accessed by temporal reference, not by retrieving stored copies or versions. Additionally, state transitions may be triggered by explicit authority events, rather than by ordinary editing actions.

In particular, freeze or seal transitions may be executed only upon receipt of a valid authority signal (e.g., the authority signal 532), which may be from the authorized cryptographic key 590 or another equivalent authority mechanism. As a result, this may cause the system 502 to close the prior temporal window and enforce immutability of the resulting state. These mechanics may ensure that finality be system-enforced, time-bound, and attributable, rather than socially or procedurally inferred. The system 502 may thus operate as a control system defined by explicit state transitions and temporal resolution, as opposed to a system that merely records changes, tracks versions, or relies on access control.

In one example, the system 502 may not be limited to single-author documents. The disclosed concept thus explicitly contemplates multiple participants interacting with the same digital document 506, while maintaining a single authoritative state at any given time. Critically, participation may be distinct from authority.

This is depicted in FIG. 7, wherein one or more authors 701,702 may be permitted to edit or interact with the digital document 506 concurrently, while the system 502 may enforce that mutability persists only until an authorized authority (e.g., the first author 701) executes a formal state transition (e.g., freeze, seal, or finalization event). Thus, the disclosed concept supports multiple actors interacting with the digital document 506 prior to finalization, supports authority to terminate mutability being explicitly governed and enforced by the system 502, and supports freeze and lock events acting as formal state transitions that end collaborative mutability. Additionally, after finalization, the disclosed concept contemplates that the authoritative state may be immutable, while all prior states may remain addressable and inspectable. The system 502 thus prevents ambiguity by ensuring that collaboration may not persist beyond authorized temporal boundaries. Accordingly, the system 502 may not be considered to be single-user-only, and may be distinguishable from collaborative editing systems that lack enforced finality or authority-based termination of mutability.

Figure 10:
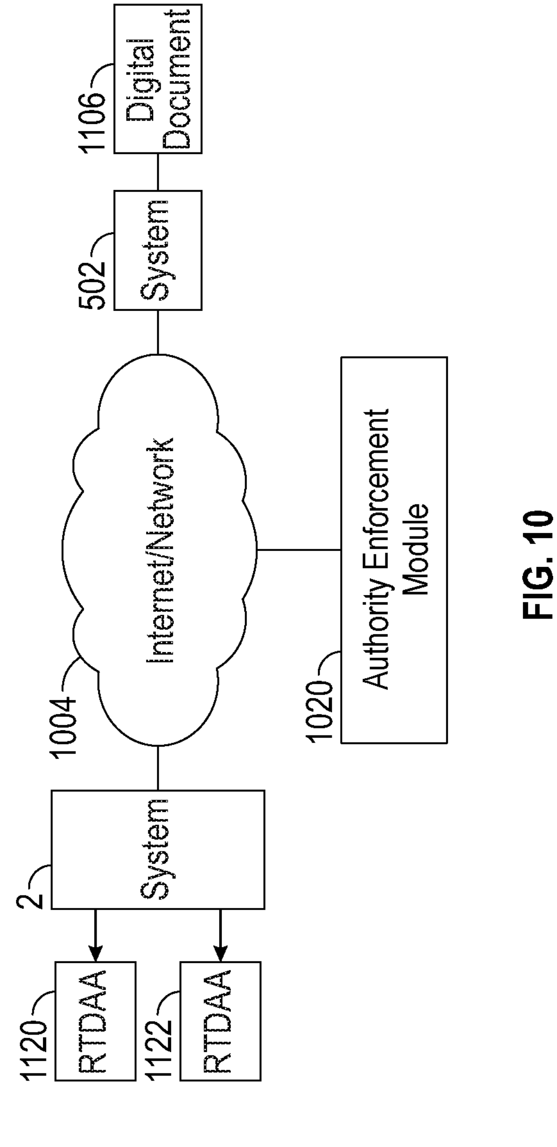
FIG. 10 is schematic view of an authorization system employing the systems of FIG. 1 and FIG. 4, in accordance with one non-limiting embodiment of the disclosed concept.

FIG. 10 is schematic view of an authorization system 1002, in accordance with one non-limiting embodiment of the disclosed concept. As shown, the system 1002 includes the system 2 (FIG. 1), the system 502 (FIG. 4), and an authority enforcement module 1020, each of which may be communicable over an internet/network 1004. In one example, the cryptographic module 10 of the system 2 may be configured to generate a first real-time digital authorization artifact 1120 based on a first live human authorization event, emit the first real-time digital authorization artifact 1120, generate a second real-time digital authorization artifact 1122 based on a second live human authorization event, and emit the second real-time digital authorization artifact 1122. Generation and emission of the artifacts 1120,1122 may be performed as described above in connection with FIGS. 1-3.

Continuing to refer to FIG. 10, the document entity 510 of the system 502 may be configured to consume the first real-time digital authorization artifact 1120 as an authority access signal in order to trigger a number of lifecycle state transitions of a digital document 1106 being represented by the document entity 510, and the temporal query interface 56 may be configured to employ the second real-time digital authorization artifact 1122 in order to resolve requests to access the digital document 1106. Additionally, in accordance with the disclosed concept, the authority enforcement module 1020 may be configured to receive a sequence from an autonomous agent, and prevent the autonomous agent from accessing the digital document 1106 because the autonomous agent did not generate the first and second real-time digital authorization artifacts 1120,1122.

In one example, it will be appreciated that the authority enforcement module 1020 may operate without requiring modification of the cryptographic module 10, the document entity 510, and the temporal query interface 560. Furthermore, the authority enforcement module 1020 may advantageously act as a coordination layer between the system 2 and the system 502, thereby ensuring that every authorization artifact of the system 2 is automatically piped into the system 502 as a triggered entry event without requiring additional user action. As will be discussed below, the authority enforcement module 1020 may govern a toggle map by presenting a user or administrator with a configurable gate assignment interface across applications, folders, drives, and critical actions. Each toggle-on location may activate an independent gate of the system 2 and trigger automatic recording of the system 502 at that location. The authority enforcement module 1020 may also enforce a deployment model, optionally a plug-in deployment model, by sitting on top of existing host infrastructure without requiring modification of the cryptographic module 10, the document entity 510, or the temporal query interface 560. It will also be appreciated that the authority enforcement module 1020 may be independently deployable, meaning it can operate as a standalone document governance layer, as a toggle map only, or as both together.

Figure 11:
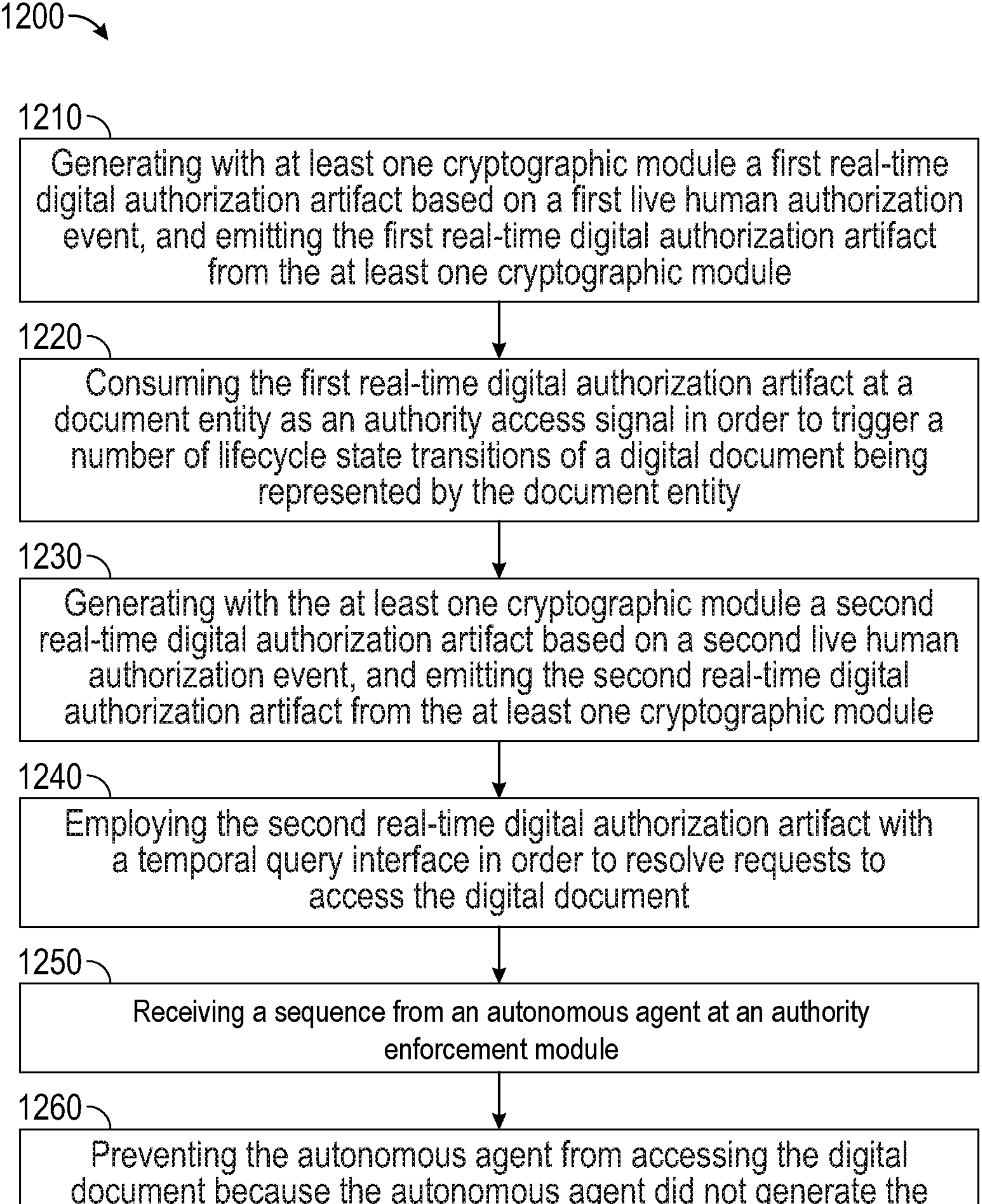
FIG. 11 is a computer-implemented method that may be performed by the system of FIG. 10.

FIG. 11 shows an example computer-implemented authorization method 1200 which may be performed by the authorization system 1002 of FIG. 10. In one example, the method 1200 comprises a first step 1210 of generating with at least one cryptographic module 10 a first real-time digital authorization artifact 1120 based on a first live human authorization event, and emitting the first real-time digital authorization artifact 1120 from the at least one cryptographic module 10; a second step 1220 of consuming the first real-time digital authorization artifact 1120 at a document entity 510 as an authority access signal in order to trigger a number of lifecycle state transitions of a digital document 1106 being represented by the document entity 510; a third step 1230 of generating with the at least one cryptographic module 10 a second real-time digital authorization artifact 1122 based on a second live human authorization event, and emitting the second real-time digital authorization artifact 1122 from the at least one cryptographic module 10; a fourth step 1240 of employing the second real-time digital authorization artifact 1122 with a temporal query interface 560 in order to resolve requests to access the digital document 1106; a fifth step 1250 of receiving a sequence from an autonomous agent at an authority enforcement module (e.g., without limitation, authority enforcement module 1020); and a sixth step 1260 of preventing the autonomous agent from accessing the digital document 1106 because the autonomous agent did not generate the first and second real-time digital authorization artifacts 1120,1122. In one example, the sixth step 1260 may be performed without relying on at least one of or each of an organizational policy, a permission, a workflow label, and a social convention. It will be appreciated that the method 1200 may include steps associated with the methods 400,900, discussed above. For example, the method 1200 may include a step of receiving the digital document 1106 from the document entity 510 after consuming the first real-time digital authorization artifact 1120, receiving a time output from a clock (e.g., see time output 522 of clock 524 in FIG. 5), and binding an authoritative state of the digital document 1106 to the time output 522 such that the time output 522 is part of a structural model of the digital document 1106. The method 1200 may also include steps of governing the authoritative state by a number of time-bound lifecycle state transitions of the digital document 1106 with an authority control layer 530; structurally enforcing the number of time-bound lifecycle state transitions of the digital document 1106 with a lifecycle state machine 540; and closing with a resolution engine 550 a number of temporal windows of mutability of the digital document 1106 in order to execute the number of time-bound lifecycle state transitions. Moreover, it will also be appreciated that the method 1200 may include providing the document entity 510 as being architecturally separated from the cryptographic module 10. Additionally, the method 1200 may also include a step of receiving an authorization challenge at a user device 50 before generating with the at least one cryptographic module 10 the first real-time digital authorization artifact 1120, and the authorization challenge may be non-replayable and dynamically generated in real-time.

Accordingly, the system 1002 may be a control layer, optionally a plug-in control layer, for critical documents that sits on top of existing systems (e.g., without limitation, the systems 2,502) without requiring infrastructure replacement. The system 1002 may govern how documents are accessed, modified, and finalized by coordinating the systems 2,502, which may work together as a unified enforcement layer. In order to perform this function, the system 1002 may work through two sequential gates provided by the system 2. The first gate of the system 2 may control access to the system 1002 itself, wherein no session may open without a live human authorization event. This means that an artificial intelligence (AI) agent with valid credentials may not initiate a session at all. The second gate may control access to the documents specifically. In one example, even if access is granted to the system 1002, reaching critical documents may require a second independent live human authorization event. Furthermore, the system 502 may then govern the digital document 1106 once accessed, enforcing three lifecycle states-malleable, fixed, and absolute—and ensuring that once the digital document 1106 is finalized, its state is permanently closed and structurally unalterable.

It will also be appreciated that the digital document 1106 (and any other digital document) may be placed into the system 1002 at any stage—not just at finalization-giving organizations the ability to govern critical documents from the moment they are created, not just at the end of their lifecycle. Accordingly, the method 1200 may further include steps of governing the digital document 1106 at a moment of creation of the digital document 1106, as well as preventing a temporal sequence from being at least one of or each of rewritten, backdated, and reordered. In this manner, the method 1200 may further include locking the first real-time digital authorization artifact 1120 into a specific temporal sequence via treating a time output 522 of a clock 524 as a structural primitive rather than metadata. Additionally, locking in such a step may be performed in order to capture a biometric verification, a device binding reference, a specific action requested, and a time coordinate as a structural element, each associated with the first live human authorization event. The combined effect of the functionality of the system 1002 may be a closed-loop system. In this manner, an agent may not open a session, may not reach the documents, and even if it somehow did, may not alter anything that has been structurally finalized. The system 1002 may make this guarantee without relying on organizational policy, permissions, workflow labels, or social convention, and the guarantee may be enforced at the architectural level.

Accordingly, the first real-time digital authorization artifact 1120 may serve as an authority signal that triggers lifecycle state transitions in the system 502. The two systems 2,502 may thus operate as a closed loop wherein the system 2 may govern who can act and the system 502 may govern what becomes permanently authoritative as a result of that action. Together, the systems 2,502 may create a dual guarantee such that an agent may not act without live human authorization, and may also not retroactively alter what has been structurally finalized. Furthermore, the system 1002 may be particularly advantageous in a scenario where an AI agent attempts a chained or recursive action sequence. In such a scenario, the system 2 may block each invocation without a fresh live human artifact, the system 502 may simultaneously prevent the agent from altering any document that has already entered a fixed or absolute state, and the combined effect may be that the agent cannot act forward and cannot alter the past. The system 1002 may provide these benefits by having the authority enforcement module 1020 sit on top of the systems 2,502 without requiring infrastructure replacement. Specifically, the authority enforcement module 1020 may be configured to automatically pipe every authorization artifact (e.g., the first and second real-time digital authorization artifacts 1120,1122) into the system 502 as a triggered entry event, wherein the two systems 2,502 may stop being separate gears and may become a single continuous audit engine.

Put differently, a live human authorization event may be verified and the first real-time digital authorization artifact 1120 may be generated. Rather than the first real-time digital authorization artifact 1120 simply being consumed by a requester system (e.g., the requester system 30, FIG. 2B) as a prerequisite for an action, the first real-time digital authorization artifact 1120 may be simultaneously sent to the system 502 as an authority signal. The system 502 may then create an immutable entry event. Because the system 502 may treat time as a structural primitive rather than metadata, the system 502 may lock that authorization into a specific temporal sequence that cannot be rewritten, backdated, or reordered. Accordingly, the immutable entry event may capture the who (biometric verification), the where (device binding reference), the what (the specific action requested), and the when (time coordinate as a structural element, not a label). The result may be a deterministic, cryptographically sealed, temporally ordered record of every human authorization event-permanent, immutable, and structurally enforced. As such, the method 1200 may further include providing a cryptographically sealed, temporally ordered, and structurally immutable record of the first live human authorization event. In this manner, the system 1002 may be configurable for a Black Box for the Agentic Web. For example, in aviation, the black box records everything so investigators can reconstruct exactly what happened. The system 1002 may thus be configured to solve issues in aviation and other industries.

It will also be appreciated that the system 1002 may do the same for AI-authorized actions. For example, an agent may not claim a human authorized something off the record. If it is not in the system 502, it did not happen. Moreover, non-repudiation may become structural: a party may not later deny authorizing an action because the system 502 contains the cryptographically sealed real-time digital authorization artifacts 1120,1122 at exact temporal coordinates. Furthermore, if an agent begins acting outside its authorized scope, the system 502 may provide a complete forensic timeline showing exactly which human authorization event opened the window and when.

Continuing to refer to FIGS. 10 and 11, when the authority enforcement module 1020 is configured in the manner described herein, the first and second real-time digital authorization artifacts 1120,1122 may automatically and simultaneously be piped into the system 502 as a triggered entry event. This may happen without any additional user action. The authorization event and the permanent record of that authorization may become the same event. Accordingly, the system 502 may capture for each live human authorization event a who (e.g., the biometric verification confirming the correct authorized human was present), a where (the device binding reference confirming the enrolled device was used), a what (the specific action that was requested and authorized), and a when (a time coordinate treated as a structural primitive, not a timestamp label, meaning it cannot be backdated, reordered, or rewritten). The result may be a continuous, automatic, immutable ledger of every human authorization event in the system. Because the system 502 may treat time as a structural element rather than metadata, the sequence of entries may be deterministic and permanent. No entry may be inserted before an existing entry. No entry may be altered after the fact. No entry may be deleted. As such, if an action occurred, there may be an entry of the system 2 in the system 502 proving that a real human authorized it, on a specific device, at a specific moment. Moreover, if there is no entry, the action may not have authorized human origin. Furthermore, if an agent attempts to act without authorization, there may be no entry and therefore no legitimacy. Additionally, if a party later attempts to deny authorizing an action, the entry in the system 502 may provide cryptographically sealed, temporally ordered, structurally immutable proof. Accordingly, the system 1002 may not be a logging system in the conventional sense and may not be an audit trail layered on top of the system 502. Instead, the system 1002 may be the authorization event itself becoming a permanent structural record-because the real-time digital authorization artifacts 1120,1122 may be the authority signal that the system 502 acts on. That is, the record and the authorization may be the same thing.

In one example, the authority enforcement module 1020 may sit on top of the systems 2,502 without requiring modification or replacement of the host infrastructure. Specifically, the architecture may cover two distinct deployment contexts. First, the authority enforcement module 1020 may be deployed as a control layer, optionally a plug-in control layer, on top of existing enterprise systems-document management platforms, financial systems, legal infrastructure, healthcare records, or any environment where critical documents and authorized actions must be governed and permanently recorded. This means that these existing infrastructures do not need to be ripped out. Instead, the authority enforcement module 1020 may be a control layer on top. Second, the authority enforcement module 1020 may optionally be deployed as a plug-in module for individual users on personal devices-protecting personal documents, financial records, and any information where the individual needs provable human authorization and permanent records of access and finalization. In both cases the core guarantee may be identical: no access without live human presence, such that every document may be governed from entry regardless of lifecycle stage, every authorization event permanently sealed in the system 502. In this manner, the optional plug-in nature may mean that the system 1002 is deployment-agnostic, that it governs whatever host system it sits on top of, whether that be at enterprise or personal scale, without modifying the core logic of that host system.

Continuing to refer to FIGS. 10 and 11, in one example a user or administrator may be presented with a map of their system—applications, folders, drives, and critical actions. Each location may have a toggle. When toggled on, a gate provided by the system 2 may be activated at that specific location, requiring live human authorization to access it. When toggled off, normal access applies. This means that the system 2 may not be fixed at a single system entry point—it may be configurable and deployable by the user across any number of specific locations within their computing environment. Every toggle-on location may automatically pipe the first and second real-time digital authorization artifacts 1120,1122 into the system 502, creating a permanent sealed record of every human authorization event at that location. The system 1002 may thus provide for a user or administrator configurable gate assignment via toggle interface, the system 2 being deployable at application, folder, drive, or action level independently, automatic recording by the system 502 triggered at each toggled location, and independent deployment—each toggle may operate as a separate gate. Furthermore, the above-described functionality may work across windows enterprise and personal computing environments. Accordingly, the method 1200 may further include providing a plurality of different locations within a computing environment each being at least one of a computer application, a computer folder, a computer drive, and a computer critical action. In this manner, the first step 1210 may be performed responsive to the cryptographic module 10 being toggled on by a user at one of the plurality of different locations.

Additionally, within the system 1002, the authority enforcement module 1020 may operate as its own dedicated section governing critical documents. Documents may enter the authority enforcement module 1020 at any lifecycle stage—malleable, fixed, or absolute—and may be governed from the moment of entry. The authority enforcement module 1020 may be independently deployable within a computing environment, meaning a user can use a toggle map alone, the authority enforcement module 1020, or both together. Accordingly, the method 1200 may further include providing the authority enforcement module 1020 as an independently deployable module within a computing environment. Documents may thus be governed from point of entry regardless of lifecycle stage.

Continuing to refer to FIGS. 10 and 11, the system 1002 may operate in a chained or recursive AI scenario, where each AI invocation in a chain may require a separate fresh live human authorization artifact. This means that the system 1002 may block not just the first unauthorized agent action but every subsequent chained action in the sequence. Furthermore, the system 1002 may be configured such that the authority enforcement module 1020 may govern documents from the moment of their creation, not just at access or finalization. The system 1002 may thus provide for a property corresponding to entry at any lifecycle stage being governed. In terms of the non-repudiation property of the system 1002, because the authorization event and the record of the system 502 may be the same atomic event, no party may later deny having authorized an action. The sealed record may thus constitute structural proof at exact temporal coordinates. Additionally, the system 1002 may be agnostic to a specific biometric modality used by the cryptographic module 10. The optional plug-in architecture may function identically regardless of whether the challenge-response of the system 2 uses voice, face, or touch.

In a native integration of the disclosed concept, architectures of the systems 2,502 may be built directly into an application or platform rather than deployed as an external plug-in. For example, a company like Microsoft may implement the system 1002 inside their agent platform. Additionally, a gate of the system 2 and a seal by the system 502 may be exposed as cloud-based APIs that any application calls directly, similar to how payment processors work. This iteration may not be a plug-in, but may be a service. Furthermore, the cryptographic module 10 may also be implemented at a chip or device firmware level rather than in software. Moreover, the system 1002 may also sit inside an existing identity layer such as Okta or Azure AD rather than as a standalone module. Accordingly, as used herein, an "authority enforcement module" is configured to provide the disclosed functionality in each of these iterations, including both in a plug-in iteration and a non-plug-in iteration.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality can be separated or combined in blocks differently in various implementations of the disclosure or described with different terminology. These and other variations, modifications, additions, and improvements can fall within the scope of the disclosure as defined in the claims that follow.

What is claimed is:

1. A computer-implemented authorization method, comprising:

generating with at least one cryptographic module a first real-time digital authorization artifact based on a first live human authorization event, and emitting the first real-time digital authorization artifact from the at least one cryptographic module;

consuming the first real-time digital authorization artifact at a document entity as an authority access signal in order to trigger a number of lifecycle state transitions of a digital document being represented by the document entity;

generating with the at least one cryptographic module a second real-time digital authorization artifact based on a second live human authorization event, and emitting the second real-time digital authorization artifact from the at least one cryptographic module;

employing the second real-time digital authorization artifact with a temporal query interface in order to resolve requests to access the digital document;

receiving a sequence from an autonomous agent at an authority enforcement module;

preventing the autonomous agent from accessing the digital document because the autonomous agent did not generate the first and second real-time digital authorization artifacts;

receiving the digital document from the document entity after consuming the first real-time digital authorization artifact, receiving a time output from a clock, and binding an authoritative state of the digital document to the time output such that the time output is part of a structural model of the digital document;

governing the authoritative state by a number of time-bound lifecycle state transitions of the digital document with an authority control layer;

structurally enforcing the number of time-bound lifecycle state transitions of the digital document with a lifecycle state machine; and closing with a resolution engine a number of temporal windows of mutability of the digital document in order to execute the number of time-bound lifecycle state transitions.

2. The computer-implemented authorization method according to claim 1, further comprising providing the document entity as being architecturally separated from the at least one cryptographic module.

3. The computer-implemented authorization method according to claim 1, further comprising governing the digital document at a moment of creation of the digital document.

4. The computer-implemented authorization method according to claim 1, wherein preventing the autonomous agent from accessing the digital document is performed without relying on at least one of an organizational policy, a permission, a workflow label, and a social convention.

5. The computer-implemented authorization method according to claim 4, wherein preventing the autonomous agent from accessing the digital document is performed without relying on each of the organizational policy, the permission, the workflow label, and the social convention.

6. The computer-implemented authorization method according to claim 1, further comprising locking the first real-time digital authorization artifact into a specific temporal sequence via treating a time output of a clock as a structural primitive rather than metadata.

7. The computer-implemented authorization method according to claim 6, further comprising preventing the temporal sequence from being at least one of rewritten, backdated, and reordered.

8. The computer-implemented authorization method according to claim 7, further comprising preventing the temporal sequence from being rewritten, backdated, and reordered.

9. The computer-implemented authorization method according to claim 6, wherein locking is performed in order to capture a biometric verification, a device binding reference, a specific action requested, and a time coordinate as a structural element, each associated with the first live human authorization event.

10. The computer-implemented authorization method according to claim 1, further comprising providing a cryptographically sealed, temporally ordered, and structurally immutable record of the first live human authorization event.

11. The computer-implemented authorization method according to claim 1, further comprising providing a plurality of different locations within a computing environment each being at least one of a computer application, a computer folder, a computer drive, and a computer critical action, wherein generating with the at least one cryptographic module and emitting the first real-time digital authorization artifact are each performed responsive to the at least one cryptographic module being toggled on by a user at one of the plurality of different locations.

12. The computer-implemented authorization method according to claim 11, further comprising providing the authority enforcement module as an independently deployable module within the computing environment.

13. The computer-implemented authorization method according to claim 1, further comprising operating the authority enforcement module without requiring modification of the at least one cryptographic module, the document entity, and the temporal query interface.

14. The computer-implemented authorization method according to claim 1, further comprising receiving an authorization challenge at a user device before generating with the at least one cryptographic module the first real-time digital authorization artifact, the authorization challenge being non-replayable and dynamically generated in real-time.

* * * * *